US012416121B2

(12) United States Patent
Mahler

(10) Patent No.: US 12,416,121 B2
(45) Date of Patent: Sep. 16, 2025

(54) TAMPER DEVICE FOR A SCREED OF A WORKING MACHINE AND A METHOD FOR ADJUSTING A STROKE OF A TAMPER DEVICE FOR A SCREED OF A WORKING MACHINE

(71) Applicant: VOLVO CONSTRUCTION EQUIPMENT AB, Eskilstuna (SE)

(72) Inventor: Anton Mahler, Wennigsen (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 596 days.

(21) Appl. No.: 17/795,192

(22) PCT Filed: Jan. 27, 2020

(86) PCT No.: PCT/EP2020/051908
§ 371 (c)(1),
(2) Date: Jul. 25, 2022

(87) PCT Pub. No.: WO2021/151462
PCT Pub. Date: Aug. 5, 2021

(65) Prior Publication Data
US 2023/0083709 A1 Mar. 16, 2023

(51) Int. Cl.
*E01C 19/48* (2006.01)
*B06B 1/16* (2006.01)

(52) U.S. Cl.
CPC .......... *E01C 19/4853* (2013.01); *B06B 1/167* (2013.01)

(58) Field of Classification Search
CPC .... E01C 19/4853; E01C 19/48; E01C 19/486; E01C 19/4866; B06B 1/167
See application file for complete search history.

(56) References Cited

U.S. PATENT DOCUMENTS 3,534,669 A * 10/1970 Cecil ........................ E02D 3/074 405/271
10,060,086 B2 8/2018 Laugwitz
(Continued)

FOREIGN PATENT DOCUMENTS

BE 795025 A 5/1973
CN 102071634 A 5/2011
(Continued)

OTHER PUBLICATIONS

Office Action and Search Report mailed Jun. 29, 2023 for Chinese Patent Application No. 202080094614.4, 17 pages (includes English translation).
(Continued)

*Primary Examiner* — Abigail A Risic
(74) *Attorney, Agent, or Firm* — Sage Patent Group

(57) ABSTRACT

The invention relates to a tamper device for a screed of a working machine, in particular a paver. The device comprises a rotatable driveable tamper shaft with an eccentric section, an eccentric bushing mounted on the eccentric section, and a connecting rod rotatable mounted on the eccentric bushing for being driveable with stroke motions having a stroke, the stroke being adjustable by an rotational adjustment of a relative rotational positioning between the eccentric bushing and the eccentric section. The device further comprises an inner-toothed hollow wheel gear train for providing the rotational adjustment. The gear train is connected to the tamper shaft, to the eccentric bushing, and to a drive force receiving element configured to be able to receive a drive force for driving the innertoothed hollow wheel gear train when the tamper shaft is rotating.

27 Claims, 16 Drawing Sheets

(56) References Cited

U.S. PATENT DOCUMENTS

| | | | | |
|---|---|---|---|---|
| 2010/0147090 | A1* | 6/2010 | Kuerten | B06B 1/166 74/61 |
| 2011/0123270 | A1 | 5/2011 | Martin et al. | |
| 2015/0139730 | A1* | 5/2015 | Buschmann | E01C 19/34 404/84.2 |
| 2015/0225909 | A1* | 8/2015 | Bertz | E01C 19/4853 404/102 |
| 2017/0183831 | A1 | 6/2017 | Laugwitz | |
| 2022/0220675 | A1* | 7/2022 | Bertz | E01C 19/486 |

FOREIGN PATENT DOCUMENTS

| | | | |
|---|---|---|---|
| DE | 9406683 | | 6/1994 |
| DE | 4307535 | A1 | 9/1994 |
| DE | 202005013966 | U1 | 10/2006 |
| EP | 2325391 | A1 | 5/2011 |
| EP | 2325392 | | 5/2011 |
| EP | 2366831 | | 9/2011 |
| EP | 2366832 | | 9/2011 |
| EP | 3249101 | | 11/2017 |
| IT | 8648553 | | 10/1986 |

OTHER PUBLICATIONS

International Search Report and Written Opinion of the International Searching Authority, PCT/EP2020/051908, mailed Oct. 20, 2020, 10 pages.

* cited by examiner

TAMPER DEVICE FOR A SCREED OF A WORKING MACHINE AND A METHOD FOR ADJUSTING A STROKE OF A TAMPER DEVICE FOR A SCREED OF A WORKING MACHINE

CROSS REFERENCE TO RELATED APPLICATIONS

This application is a 35 U.S.C. § 371 national stage application of PCT International Application No. PCT/EP2020/051908 filed on Jan. 27, 2020, the disclosure and content of which is incorporated by reference herein in its entirety.

TECHNICAL FIELD

The invention relates to a tamper device for a screed of a working machine and a method for adjusting a stroke of a tamper device for a screed of a working machine.

The invention is applicable on working machines within the fields of industrial construction machines or construction equipment, in particular road pavers or asphalt finishers, Although the invention will be described with respect to a road paver, the invention is not restricted to this particular machine, but may also be used in other pavers or other working machines.

BACKGROUND

A tamper device for a screed of a road paver is known from US 2011/0123270 A1. The tamper device according to US 2011/0123270 A1 comprises an eccentric shaft comprising an eccentric section and an eccentric bushing arranged thereon which is rotatable mounted in a connecting rod driving a tamper bar. The stroke of the tamper bar is adjustable by a relative rotation between the eccentric shaft and the eccentric bushing. A tappet and a preselection area with two tappet stop positions defining two different tamper bar strokes are functionally provided between the eccentric shaft and the eccentric bushing, so that the tappet can be adjusted without tools to each tappet stop position by a reversal of the direction of rotation of the eccentric shaft to switch between the two strokes.

SUMMARY

An object of the invention is to provide an improved tamper device for a screed of a working machine and an improved method for adjusting a stroke of a tamper device for a screed of a working machine, in particular to provide a tamper device for a screed of a working machine and a method for adjusting a stroke of a tamper device for a screed of a working machine which provide for an adjustment of the stroke while the tamper device is running.

According to a first aspect of the invention, the object is achieved by a tamper device according to claim 1, The tamper device for a screed of a working machine, in particular a paver, comprises: a rotatable driveable tamper shaft comprising an eccentric section, an eccentric bushing mounted on the eccentric section, and a connecting rod being rotatable mounted on the eccentric bushing for being driveable with stroke motions having a stroke. The stroke is adjustable by an rotational adjustment of a relative rotational positioning between the eccentric bushing and the eccentric section. The tamper device is characterized by an inner-toothed hollow wheel gear train for providing the rotational adjustment. The gear train is connected to the tamper shaft, to the eccentric bushing, and to a drive force receiving element. The drive force receiving element is configured to be able to receive a drive force for driving the inner-toothed hollow wheel gear train when the tamper shaft is rotating.

In the present application an inner-toothed hollow wheel gear train is a gear train which comprises an inner-toothed hollow wheel. In the present application the term inner-toothed hollow wheel means that there is a hollow wheel which comprises teeth on its inside surface. Such an inner-toothed hollow wheel can for example be a ring gear of a planetary gear or a circular spline of a strain wave gear. The latter also known as an harmonic gear.

The present invention comprises the perception that with the above-referenced known tamper device the stroke of the connecting rod driving the tamper bar can only be switched between two strokes at two preselected positions. This is a serious drawback since the local position of the screed might require an adjustment of the stroke which adjustment is not matching to the preselected positions. Since these two preselected positions can only be reached by a reversal of the direction of rotation of the eccentric shaft, it is necessary to stop the tamper to switch between the two strokes. This is a serious drawback since a stop of the tamper leads to a stop of the paver.

By the provision of a tamper device which comprises a rotatable driveable tamper shaft comprising an eccentric section, an eccentric bushing mounted on the eccentric section, and a connecting rod being rotatable mounted on the eccentric bushing for being driveable with stroke motions having a stroke, the stroke being adjustable by an rotational adjustment of a relative rotational positioning between the eccentric bushing and the eccentric section, and which tamper device is characterized by an inner-toothed hollow wheel gear train for providing the rotational adjustment, the gear train being connected to the tamper shaft, to the eccentric bushing, and to a drive force receiving element being configured to be able to receive a drive force for driving the inner-toothed hollow wheel gear train when the tamper shaft is rotating, it is in particular provided the advantage of an adjustability of the stroke while the tamper device is running.

An advantage of the tamper device of the present invention is that the stroke of the connecting rod driving a tamper bar can be adjusted individually and arbitrarily. This is a strong advantage since an individual local position of the screed might require an individual adjustment of the stroke. If for example a road paver uses more than one screed section, for example a basic screed and optionally screed extensions that can be extended at the basic screed for changing the working width of the road paver, each of these components of the screeds may comprise its own tamper device, so that the present invention enables an individual adjustment of the stroke for each screed section. Due to the inventive use of an inner-toothed hollow wheel gear train in the inventive tamper device an adjustment of the stroke can be provided during rotation of the tamper shaft. It is therefore in particular not necessary to stop the tamper to adjust the stroke. This is a strong advantage since therefore a costly stop of the work of the working machine, for example a stop of a paver, can be avoided.

According to one embodiment, the inner-toothed hollow wheel gear train comprises a planetary gear. The use of a planetary gear is a reliable and cost-efficient implementation of the present invention.

According to a further embodiment, the planetary gear is a two-stage planetary gear and comprises a shaft side ring gear being connected to the tamper shaft in a torque-proof manner, a bushing side ring gear being connected to the eccentric bushing in a torque-proof manner, a common planet gear connecting the shaft side ring gear with the bushing side ring gear, and a common sun gear being connected to the drive force receiving element in a torque-proof manner. By connecting a shaft side ring gear being an inner-toothed hollow wheel with the tamper shaft in a torque proof manner and connecting a bushing side ring gear being another inner-toothed hollow wheel with the eccentric bushing in a torque-proof manner, and using the common sun gear of such two-stage planetary gear as the drive force receiving element a simple, reliable and cost-efficient configuration of the inventive gear train is provided for driving the gear train when the tamper shaft is running.

A further embodiment comprises a housing for the shaft side ring gear, the bushing side ring gear, the planet gear, and the sun gear, the housing being connected to the eccentric bushing in a torque-proof manner, the bushing side ring gear being connected to the housing in a torque-proof manner, whereas the shaft side ring gear, the planet gear, and the sun gear being rotatable relative to the housing. By providing a housing for the gears of the planetary gear and by connecting the housing to the eccentric bushing of the tamper shaft in a torque-proof manner it is provided a simple and reliable protection of the gears of the planetary gear in a possibly rough environment when the inventive tamper device is for example used on a road paver, while simultaneously the housing is the second stage or the output side of such planetary gear.

According to a further embodiment the shaft side ring gear comprises less teeth than the bushing side ring gear, preferably a ratio of a number of teeth of the shaft side ring gear to a number of teeth of the bushing side ring gear being about 1:30 to about 1:250. Such range of ratios have been found as being particularly useful for the requirements of road pavers.

According to a further embodiment the shaft side ring gear comprises more teeth than the bushing side ring gear, preferably a ratio of a number of teeth of the shaft side ring gear to a number of teeth of the bushing side ring gear being about 30:1 to about 250:1. Such range of ratios have been found as being particularly useful for the requirements of road pavers.

According to a further embodiment the shaft side ring gear comprises 87 teeth and the bushing side ring gear comprises 89 teeth, the planet gear comprises 13 teeth, and the sun gear comprises 62 teeth. Such range of ratios have been found as being particularly useful for the requirements of road pavers.

According to a further embodiment the drive force receiving element comprises a brake force receiving element being configured to be able to receive a brake force for driving the inner toothed hollow wheel gear train when the tamper shaft is rotating. This embodiment of the present invention is a particularly advantageous implementation of the present invention. This is because the present invention comprises the perception that by using an inner-toothed hollow wheel gear train it is not only possible to provide the rotational adjustment of a relative rotational positioning between the eccentric bushing and the eccentric section while the tamper shaft is rotating or running but it is additionally possible to use the rotational energy of the rotating tamper shaft for driving the inventive gear train by providing a brake force receiving element receiving a brake force for driving the gear train. By for example connecting the brace force receiving element with the input side of the inventive gear train as described herein the brake force receiving element may simply rotate together with the whole gear train which itself is rotating together with the tamper shaft due to its connection to the tamper shaft. Only if an adjustment of the relative rotational positioning between the eccentric bushing and the eccentric section for an adjustment of the stroke is desired, a brake force is provided to the brake force receiving element connected with the input side of the inventive gear train to drive the inventive gear train to thereby provide the rotational adjustment of a relative rotational positioning between the eccentric bushing and the eccentric section.

According to a further embodiment the brake force receiving element is configured to be able to receive a brake force by comprising an adjustment wheel sitting on the tamper shaft, the adjustment wheel being rotatable relative to the tamper shaft, the adjustment wheel being connected to the inner-toothed hollow wheel gear train in a torque-proof manner, whereby the adjustment wheel is being configured to drive the eccentric bushing in a direction against a direction of rotation of the tamper shaft, in case the adjustment wheel is receiving a brake force when the tamper shaft is rotating. By using an adjustment wheel sitting on the tamper shaft a simple and cost-efficient implementation of a brake force receiving element is provided.

According to a further embodiment the adjustment wheel is connected to the inner-toothed hollow wheel gear train in a torque-proof manner via a connecting tube surrounding the tamper shaft. By connecting the adjustment wheel to the inventive gear train via a tube surrounding the tamper shaft a reliable and cost efficient implementation of a torque-proofed connection between the inventive adjustment wheel and the inventive gear train is provided.

According to a further embodiment, in case the gear train comprises the planetary gear as described herein, the adjustment wheel is connected to the sun gear in a torque-proof manner. By connecting the adjustment wheel with the sun gear of a planetary gear as described herein in a torque-proof manner a simple and cost-efficient implementation of a connection between the adjustment and a planetary gear used as the inventive gear train is provided since the sun gear is the inner most part of a planetary gear so that it is in particular simple to for example use a connecting tube as mentioned above to connect the adjustment wheel and the sun gear.

A further embodiment comprises a further brake force receiving element being connected with the brake force receiving element via a gear unit, the further brake force receiving element being configured to be able to receive a brake force for driving the gear unit by comprising a further adjustment wheel sitting on the tamper shaft, the further adjustment wheel being rotatable relative to the tamper shaft, whereby the further adjustment wheel is being configured to drive the adjustment wheel in a direction of rotation of the tamper shaft, in case the further adjustment wheel is receiving a brake force when the tamper shaft is rotating. By providing a further brake force receiving element in addition to the brake force receiving element, and by connecting the further brake force receiving element with the brake force receiving element via a gear unit, it is advantageously possible by for example using a further adjustment wheel for the further brake force received element to provide a brake force to the further adjustment wheel which brake force is then translated by the gear unit being connected to the adjustment wheel so that the adjustment wheel can be rotated in the same direction as the rotation direction of the tamper shaft by providing a brake force to the further adjustment wheel.

Accordingly, due to this particularly advantageous embodiment of the present invention it is possible by using two adjustment wheels, the adjustment wheel and the further adjustment wheel, connected via a gear unit, to either brake on the adjustment wheel to drive the eccentric bushing in a direction against a direction of rotation of the tamper shaft, or to brake on the further adjustment wheel so that its rotation is slowed down with respect to the rotation of the tamper shaft, this slowing down of the further adjustment wheel being translated by the gear unit into an acceleration of the adjustment wheel which drives the eccentric bushing in a direction of rotation of the tamper shaft. With other words: By the present embodiment the direction of rotational adjustment of a relative rotational positioning between the eccentric bushing and the eccentric section can be chosen by choosing either the adjustment wheel or the further adjustment wheel to be braked on. Thereby a necessity to provide a rotational adjustment of a relative rotational positioning between the eccentric bushing and the eccentric section of more than 180° is advantageously avoided. Accordingly, an adjustment on the basis of this embodiment of the present invention substantially enhances the velocity of the rotational adjustment.

According to a further embodiment the gear unit comprises a cog wheel and/or a friction gear. Hereby reliable and cost-efficient implementations of the present invention are provided.

A further embodiment comprises a mechanical brake and/or an eddy current brake for providing a brake force to the brake force receiving element and/or the further brake force receiving element. Hereby reliable and cost-efficient implementations of the present invention are provided.

A further embodiment comprises a tamper bar being mounted at an end of the connecting rod.

According to a further embodiment a shaft eccentricity of the eccentric section and a bushing eccentricity of the eccentric bushing are configured so that the stroke is adjustable between a predefined minimum and a predefined maximum. Preferably, if the predefined minimum is zero, this embodiment provides the possibility to not only arbitrarily adjust the stroke between a predefined non-zero minimum and a predefined maximum but to adjust the stroke even to zero. Such a possibility may be useful in particular if a screed used two parallel tamper bars, for example one tamper bar being mounted at the ends of two connecting rods having an adjustable stroke according to the present invention, and another tamper bar located downstream of the afore-mentioned tamper bar having a fixed stroke. By this embodiment it would then be possible to adjust the stroke of the upstream tamper bar to a predefined minimum. The minimum may be zero if for example the impact of the stroke of the second tamper bar would be sufficient for a certain working condition of a respective road paver.

According to a further embodiment the tamper shaft comprises a further eccentric section with a further eccentric bushing mounted on the further eccentric section, and a further connecting rod being rotatable mounted on the further eccentric bushing for being driveable with stroke motions having a stroke, the stroke being adjustable by an rotational adjustment of a relative rotational positioning between the further eccentric bushing and the further eccentric section, wherein the eccentric bushing and the further eccentric bushing are connected in a torque-proof manner by an elongated tube surrounding the tamper shaft between the eccentric bushing and the further eccentric bushing. By this embodiment it is possible to in parallel adjust the stroke of the connecting rod and the further connecting rod by connecting the eccentric bushings of each of the connecting rods so that a relative rotational positioning of the eccentric bushing according to the present invention causes a parallel additional positioning of the further eccentric bushing.

According to a further embodiment the elongated tube is mounted at each bushing with lateral play to compensate a lateral movement of the bushings due to the eccentricity of the respective eccentric sections on the tamper shaft when the stroke being adjusted by an rotational adjustment of a relative rotational positioning between the eccentric bushings and the eccentric sections. By mounting the elongated tube connected the eccentric bushing with the further eccentric bushing at each bushing with lateral play this embodiment advantageously compensates a lateral movement of the bushings due to the eccentricity of the respective eccentric sections on the tamper shaft when the stroke being adjusted by an rotational adjustment of a relative rotational positioning between the eccentric bushings and the eccentric sections of the tamper shaft.

A further embodiment comprises an electric motor, and the drive force receiving element is configured to be driven by the electric motor. By providing, an electric motor and by configuring the drive force receiving element to be driven by the electric motor, for example by connecting the output side of the electric motor with the drive force receiving element a well-known, reliable and cost-efficient implementation for driving the inventive gear train is provided. Additionally, by using a motor, the drive force receiving element can receive a drive force for driving the inner-toothed hollow wheel gear train when the tamper shaft is rotating, as well as when the tamper shaft is standing still.

According to a further embodiment the inner-toothed hollow wheel gear train comprises a strain wave gear. The use of a strain wave gear, also known as a harmonic gear or harmonic drive, provides the advantages of nearly no backlash, enhanced compactness, reduced weight, high gear ratios, reconfigurable ratios within the same housing, enhance resolution and excellent repeatability when repositioning initial loads, and a high torque capability. In particular, the use of a strain wave gear provides high gear reduction ratios in a small volume. As an example, it is possible to realize a gear reduction ratio from 30:1 up to 320:1 in the same space in which a planetary gear typically produces a reduction ratio of 10:1.

According to a further embodiment the strain wave gear comprises a circular spline being connected to the tamper shaft in a torque-proof manner, a flex spline being connected to the eccentric bushing in a torque-proof manner, and a drive element for moving the flex spline and being connected to the drive force receiving element in a torque-proof manner. By connecting the circular spline with the tamper shaft and therefore with the eccentric section of the tamper shaft in a torque-proof manner a simple and reliable implementation of a strain wave gear as the gear train according to the present invention is provided. In an alternative embodiment the circular spline being connected to the eccentric bushing in a torque-proof manner while the flex spline is connected to the tamper shaft and therefore to the eccentric section of the tamper shaft in a torque-proof manner.

In case the drive force receiving element of this further embodiment comprises a brake force receiving element being configured to be able to receive a brake force for driving the strain wave gear when the tamper shaft is rotating, the brake force receiving element may be configured to be able to receive a brake force by comprising an adjustment wheel sitting on the tamper shaft, the adjustment wheel being rotatable relative to the tamper shaft and being connected to the flex spline in a torque-proof manner, preferably via a connecting tube surrounding the tamper shaft, whereby the adjustment wheel is being configured to drive the eccentric bushing in a direction against a direction of rotation of the tamper shaft, in case the adjustment wheel is receiving a brake force when the tamper shaft is rotating. Hereby a reliable and cost-efficient implementation of the present invention is provided. As an alternative implementation, the adjustment wheel may be connected to a circular spline in a torque-proof manner of a strain wave gear as described herein.

The present invention also relates to a screed of a working machine, in particular a paver, comprising a tamper device as described herein.

The present invention also relates to a working machine, in particular a road paver, comprising a screed as described herein.

According to a second aspect of the present invention, the object is achieved by a method for adjusting a stroke of a tamper device for a screed of a working machine according to claim 19. The tamper device comprising a rotatable driveable tamper shaft comprising an eccentric section, an eccentric bushing mounted on the eccentric section, and a connecting rod being rotatable mounted on the eccentric bushing for being driveable with stroke motions having a stroke, the stroke being adjustable by an rotational adjustment of a relative rotational positioning between the eccentric bushing and the eccentric section. The method comprises the steps of providing the rotational adjustment by driving an inner-toothed hollow wheel gear train by providing a drive force to a drive force receiving element. The drive force receiving element is connected to the inner-toothed hollow wheel gear train. The drive force receiving element is configured to be able to receive the drive force for driving the inner-toothed hollow wheel gear train when the tamper shaft is rotating. The inner-toothed hollow wheel gear train is also connected to the tamper shaft and to the eccentric bushing.

By the provision of a method for adjusting a stroke of a tamper device for a screed of a working machine, the tamper device comprising: a rotatable driveable tamper shaft comprising an eccentric section, an eccentric bushing mounted on the eccentric section, and a connecting rod being rotatable mounted on the eccentric bushing for being driveable with stroke motions having a stroke, the stroke being adjustable by an rotational adjustment of a relative rotational positioning between the eccentric bushing and the eccentric section, which method is characterized by the steps of providing the rotational adjustment by driving an inner-toothed hollow wheel gear train by providing a drive force to a drive force receiving element connected to the inner-toothed hollow wheel gear train and being configured to be able to receive the drive force for driving the inner-toothed hollow wheel gear train when the tamper shaft is rotating, the inner-toothed hollow wheel gear train also being connected to the tamper shaft and to the eccentric bushing, it is in particular provided the advantage of an adjustability of the stroke while the tamper device is running.

An advantage of the method of the present invention is that the stroke of the connecting rod driving a tamper bar can be adjusted individually. This is a strong advantage since an individual local position of the screed might require an individual adjustment of the stroke. Due to the inventive use of an inner-toothed hollow wheel gear train in the inventive tamper device, an adjustment of the stroke can be provided during rotation of the tamper shaft. It is therefore in particular not necessary to stop the tamper to adjust the stroke. This is a strong advantage since therefore a costly stop of the work of the working machine, for example a stop of a paver, can be avoided.

According to one embodiment, the method comprises the further step of measuring an angle of the relative rotational positioning between the eccentric bushing and the eccentric section. Hereby an exact information about the relative rotational positioning between the eccentric bushing and the eccentric section can be retrieved.

According to a further embodiment, the method comprises the further step of using the measured angle of the relative rotational positioning to define the amount of rotational adjustment of the relative rotational positioning between the eccentric bushing and the eccentric section. Hereby a precise adjustment of the relative rotational positioning between the eccentric bushing and the eccentric section and thereby a precise determination of the stroke can be achieved. This possibility is particularly advantageous if such method is for example used in combination with a measurement of a laid material thickness of the paved material and/or of a measurement of compaction of the paved material so that the stroke can immediately be adjusted on the basis of the measured parameters of material thickness and/or compaction and the actual stroke derived from the actually measured angle of the relative rotational positioning.

The present invention also relates to a computer program comprising program code means for performing the steps of the method for adjusting a stroke of a tamper device for a screed of a working machine as described herein, when said program is run on at least one computer.

The present invention also relates to a computer readable medium carrying a computer program comprising program code means for performing the steps of the method for adjusting a stroke of a tamper device for a screed of a working machine as described herein, when said program product is run on at least one computer.

The present invention also relates to a control unit for controlling a tamper device for a screed of a working machine, in particular a paver, the control unit being configured to perform the steps of the method for adjusting a stroke of a tamper device for a screed of a working machine as described herein.

According to one embodiment, the control unit comprises a mechanical and/or electrical sensor for measuring an angle of the relative rotational positioning between the eccentric bushing and the eccentric section.

The present invention also relates to a working machine, in particular a road paver, comprising a control unit as described herein.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings and the following detailed description of the drawings, identical elements or elements with the same function are indicated with the same reference numeral.

In the drawings.

DETAILED DESCRIPTION OF EXAMPLE EMBODIMENTS OF THE INVENTION

Figure 1:
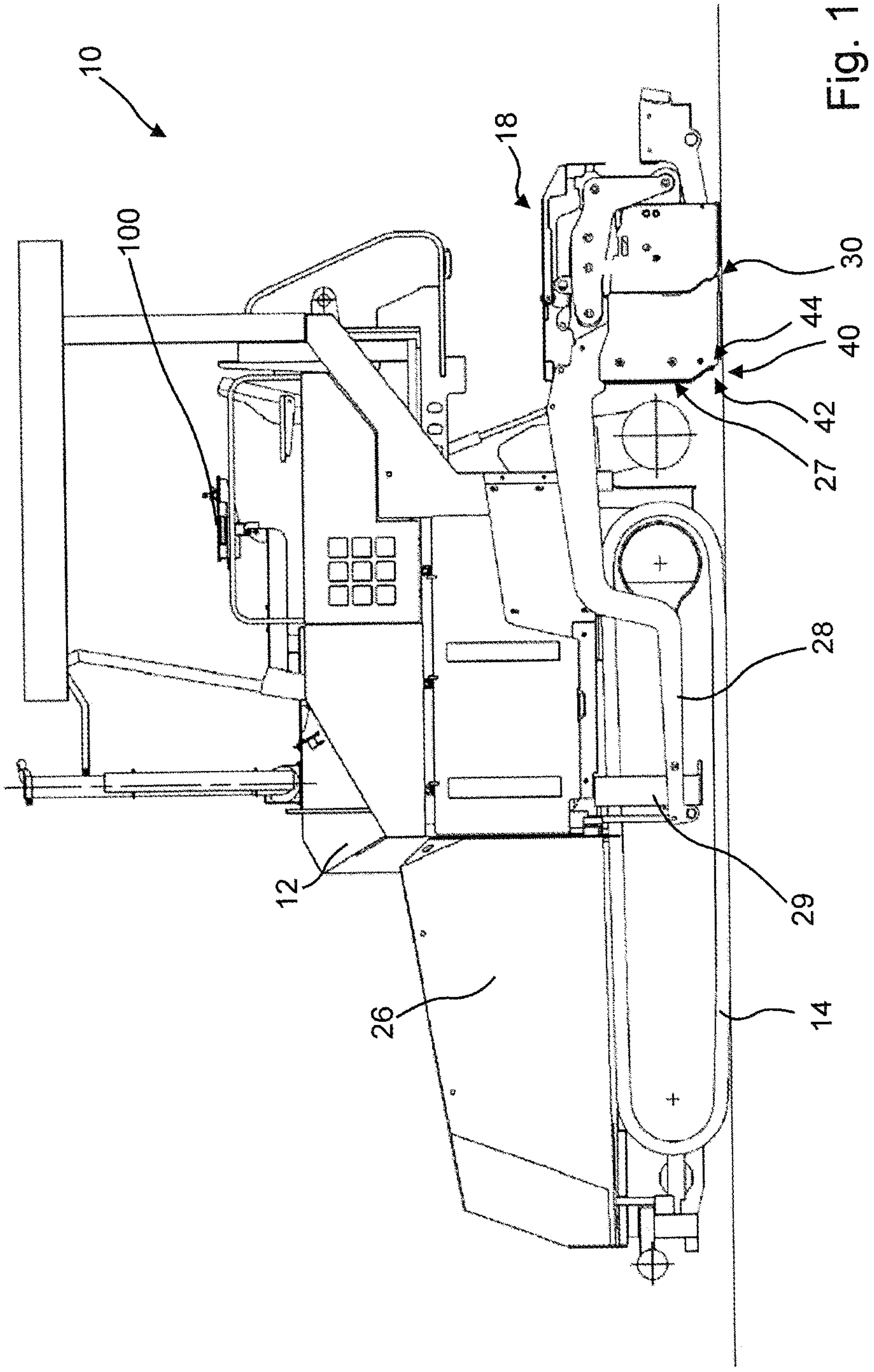
FIG. 1 is an illustration of a schematically side view of a road paver.
Figure 2:
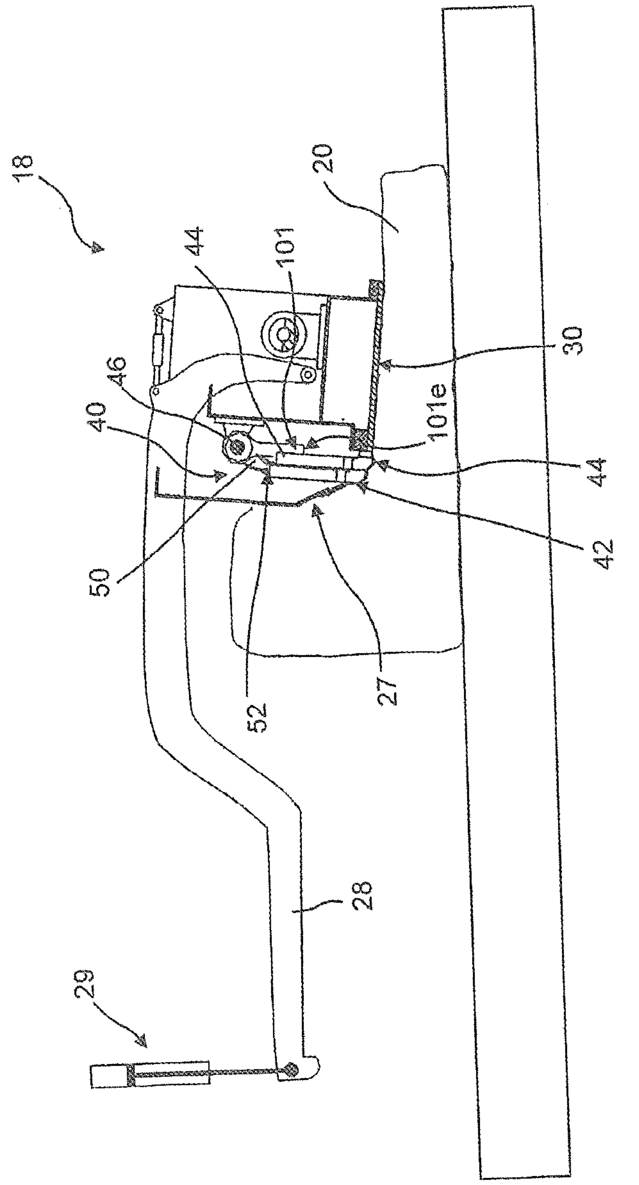
FIG. 2 is a schematic illustration, partly in cross-section, of a screed of a working machine.

FIG. 1 is an illustration of a schematically side view of a road paver 10. The road paver 10 comprises a frame 12 with a set of ground-engaging elements 14 such as tracks or wheels coupled with the frame 12. The elements 14 may be driven by an engine inside the frame in a conventional manner. The engine may further drive an associated generator in a conventional manner to drive a screed 18 of the road paver 10. The screed 18 is attached at the rear end of the road paver 10 to spread a compact paving material into a mat 20 as shown in FIG. 2. The road paver 10 additionally comprises a hopper 26 for storing paving material, and a conveyer system to move the paving material from the hopper 26 to a deflector plate 27 in front of the screed 18.

The screed 18 is pivotally connected behind the road paver 10 by a pair of tow arms 28 that extend on each side of the frame of the road paver 10 between the frame 12 and the screed 18. The tow arms 28 are connected to frame 12 in a pivotable manner so that the position and orientation of the screed 18 relative to the frame 12 and to the surface being paved may be adjusted by raising or lowering the tow arm actuators to control the thickness of the paving material deposited by the road paver 10 below a base plate 30 of the screed 18.

FIG. 2 is a schematic illustration, partly in cross section, of a screed 18 of a working machine, of for example a road paver 10 of FIG. 1, comprising a tamper device 40 as described herein. The construction and function of the screed 18 of FIG. 2 is substantially the same as described above with respect to the screed of the road paver 10 of FIG. 1. Such screed 18 may have any configurations known from the prior art. In particular, screed 18 of FIG. 1 may be a single or a multiple sections screed.

Screed 18 may include a screed extension provided behind and adjacent to each of the left and right main screed sections. The screed extensions may be slidable moveable laterally between retracted and extended positions such that varying width of paving material 20 can be laid. The lateral movement of the extensions of the screed 18 may be driven by respective screed width actuators. Although not shown in FIG. 2, each of a main screed 18 and possible extendable extension screeds and other possible screed broadening parts may be provided with at least one tamper device 40 as exemplary explained herein for the screed 18 of FIG. 2.

As shown in FIGS. 1-2, tamper device 40 comprises an upstream tamper bar 42 and a downstream tamper bar 44. The upstream tamper bar 42 is closer to the deflector plate 27, while the downstream tamper bar 44 is closer to the base plate 30 of the screed 18.

Upstream tamper bar 42 is mounted at a lower end 52 of a connecting rod 50. Downstream tamper bar 44 is mounted at a lower end 101*e* of a downstream connecting rod 101. Both connecting rods 50 and 101 are mounted on a rotatable drivable tamper shaft 46 of screed 18.

Figure 2B:
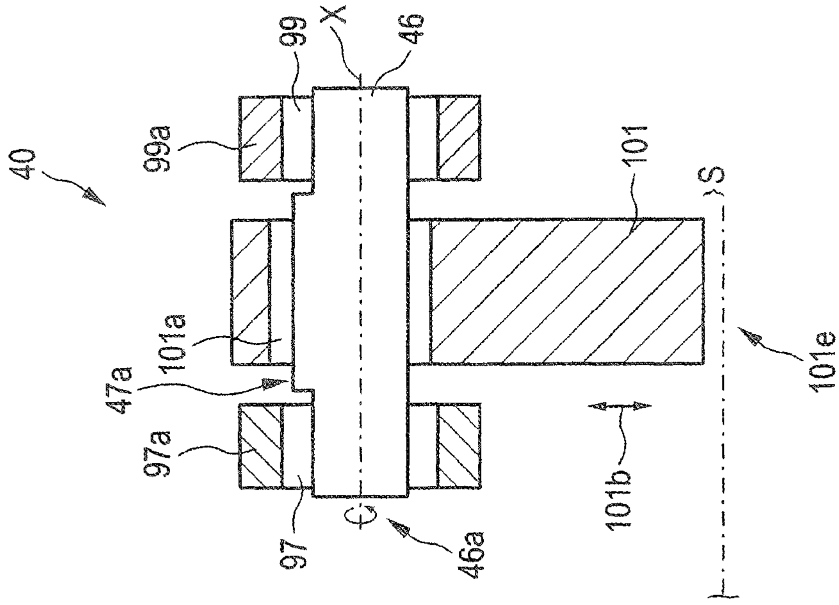
FIGS. 2*a* and 2*b* are schematic and simplified illustrations of two exemplary working positions of a downstream connecting rod according to FIG. 2.
Figure 2A:
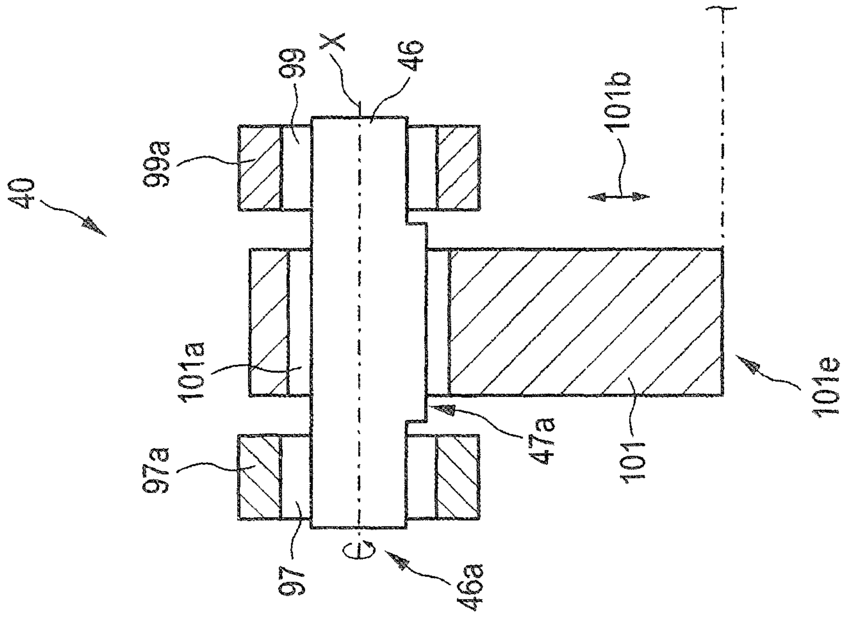

FIGS. 2*a* and 2*b* are schematic and simplified illustrations of two exemplary working positions of a downstream connecting rod 101 according to FIG. 2 in cross section. FIG. 2*a* shows a first exemplary working position of downstream connecting rod 101 and FIG. 2*b* shows a second exemplary working position of downstream connecting rod 101. FIGS. 2*a* and 2*b* serve to illustrate the structure and the working principle of how tamper shaft 46 lifts and lowers connecting rod 101 as tamper shaft 46 rotates.

As shown in FIGS. 2*a* and 2*b*, tamper shaft 46 is rotatable drivable around its longitudinal axis X as indicated by arrow 46*a*. Tamper shaft 46 is rotatable mounted in bearings 97 and 99 which are located in respective housing structures 97*a* and 99*a* which are part of screed 18. Tamper shaft 46 comprises an eccentric section 47*a*, i.e. a section having a central longitudinal axis laterally shifted with respect to the longitudinal axis X of rotation of tamper shaft 46. Tamper shaft 46 is rotatable in a bearing 101*a* of connecting rod 101. Connecting rod 101 is mounted with bearing 101*a* on the eccentric section 47. Mounted at an end 101*e* of connecting rod 101 is the tamper bar 44 not shown in FIGS. 2*a* and 2*b*.

Tamper device 40 according to FIGS. 2*a* and 2*b* operates as follows: Rotation of tamper shaft 46 around its longitudinal axis X according to arrow 46*a* also rotates eccentric section 47*a* of tamper shaft 46. The rotation of eccentric section 47*a* in bearing 101*a* of connecting rod 101 causes connecting rod 101 moving up and down as indicated by double arrow 101*b*, in FIG. 2*a*, eccentric section 47 is depicted as having reached its lowermost position so that also end 101*e* of connecting rod 101 has reached its lowermost position. Further rotating tamper shaft 46 according to arrow 46*a* with an amount of 180° moves eccentric section 47 in an opposite and uppermost position as illustrated in FIG. 2*b*.

This rotation of section 47 into the uppermost position also causes connecting rod 101 to reach its uppermost position according to FIG. 2*b*. The difference between the lowermost position according to FIG. 2*a* and the uppermost position of connecting rod 101 is a stroke S of tamper bar 44. Stroke S is indicated in FIG. 2*b* by a curly bracket showing the distance S between a dashed line indicative of the lowermost position according to FIG. 2*a*, and end 101*e* of rod 101. The eccentricity of the eccentric section 47 determines the stroke S of connecting rod 101 and tamper bar 44, respectively.

Continuing this rotation according to arrow 46*a* causes an up and down movement of connecting rod 101 according to arrow 101*b*, Tamper bar 44 mounted at end 101*e* therefore conducts the same up and down movement according to arrow 101*b*.

The tamper shaft 46 with eccentric section 47 may be rotated according to arrow 46*a* at a certain rotational speed. The rotational speed determines the frequency of the vertical up and down movements 101*b*. The rotational speed of a rotation 46*a* of the tamper shaft 46 and thus the operating frequency of connecting rod 101 and tamper bar 44 is preferably set to provide a desired compaction result at a predefined paving speed of the paver 10 for the used road construction material.

Figure 2D:
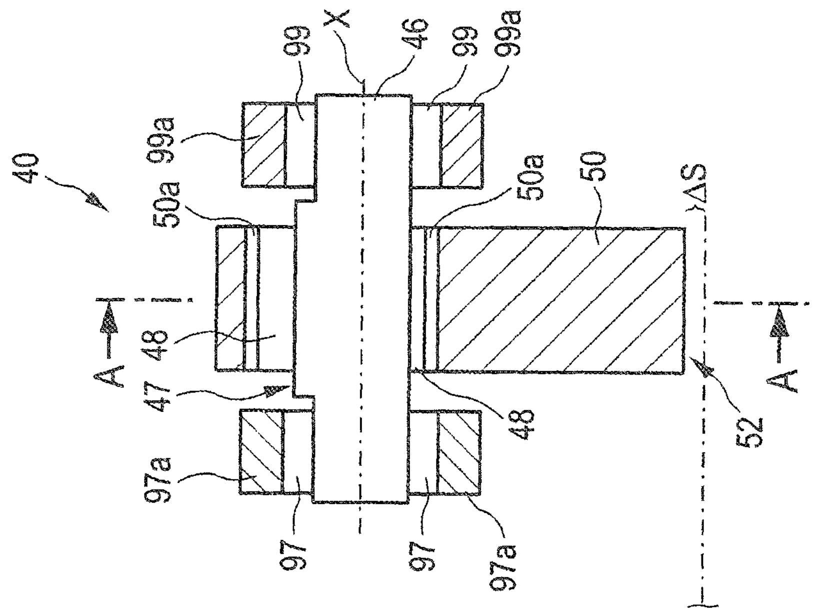
FIGS. 2*c* and 2*d* are schematic and simplified illustrations of two exemplary working positions of an upstream connecting rod according to FIG. 2.
Figure 2C:
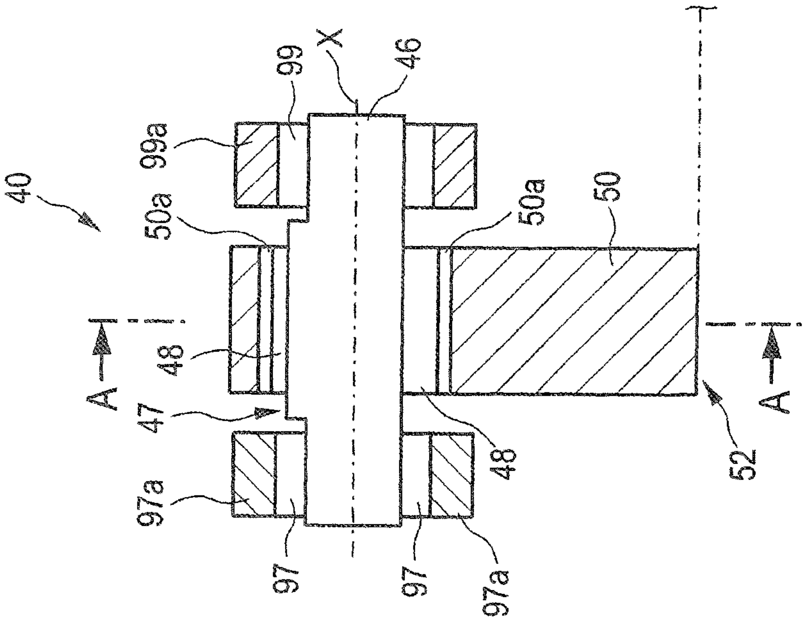
Figure 2F:
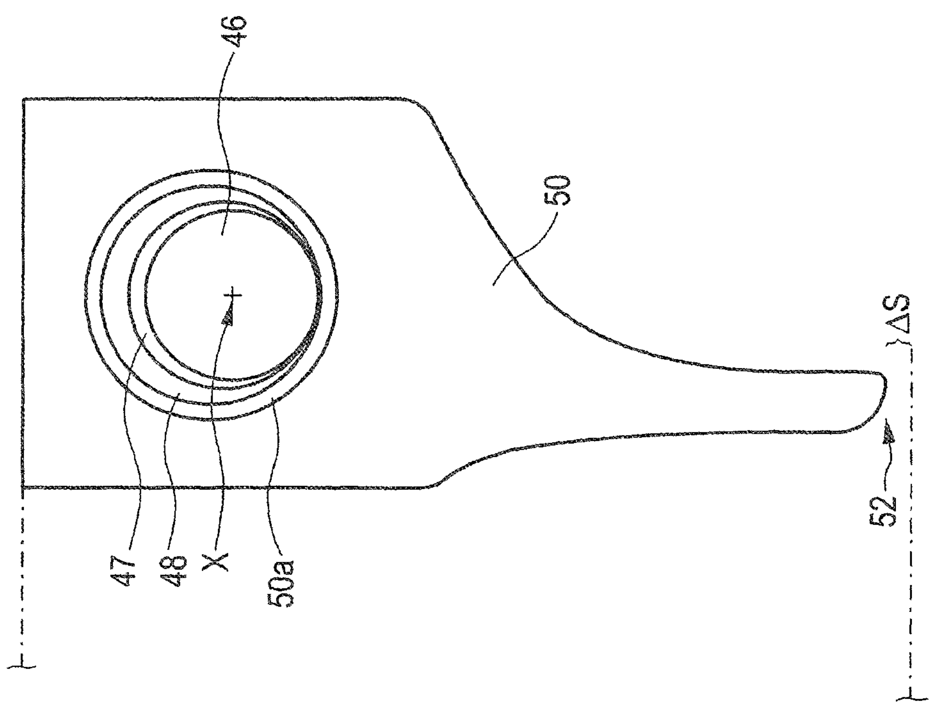
FIGS. 2*e* and 2*f* are schematic and simplified cross-sections through the upstream connecting rod along plane A-A shown in FIGS. 2*c* and 2*d*, respectively.
Figure 2E:
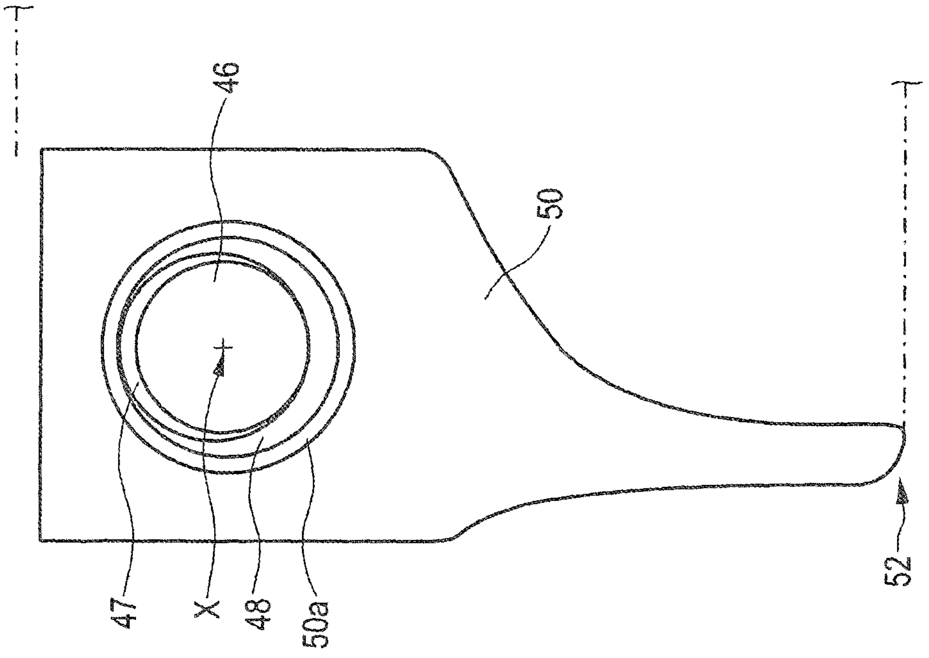

FIGS. 2*c* and 2*d* are schematic and simplified cross sections to illustrate an adjustment ΔS of the stroke S by a rotation of eccentric bushing 48 by showing two exemplary adjustments of a working position of an upstream connecting rod 50 according to FIG. 2. FIGS. 2*e* and 2*f* are schematic and simplified cross-sections through the upstream connecting rod 50 along plane A-A as shown in FIGS. 2*c* and 2*d*, respectively, to further clarify and facilitate understanding of the adjustment of the stroke S by a rotation of eccentric bushing 48.

As shown in FIGS. 2*c* to 2*f*, similar to downstream rod 101, also upstream rod 50 sits on an eccentric section 47 of tamper shaft 46 so that generally also rod 50 may move up and down with a stroke S while shaft 46 is rotating in rod 50. But the stroke S of rod 50 may be adjusted, and FIGS. 2*c* to 2*f* serve to illustrate the structure and the working principle of how to adjust a stroke S of the upstream connecting rod 50 and thereby of the upstream tamper bar 42 of FIG. 2.

As shown in FIGS. 2*c* to 2*f*, the difference between the mounting of downstream rod 101 on shaft 46 and the mounting of upstream rod 50 on shaft 46 is that the bearing 101*a* of downstream rod 101 is mounted directly on shaft 46 while a bearing 50*a* of upstream rod 50 is not directly mounted on shaft 46. This is because an eccentric bushing 48 is located between bearing 50*a* of upstream rod 50 and shaft 46. Eccentric bushing 48 is located on the eccentric section 47 of shaft 46. Eccentric bushing 48 is rotatable in bearing 50*a* of rod 50. Additionally, eccentric bushing 48 is rotatable with respect to the eccentric section 47, independent of a rotational position of eccentric section 47 of shaft 46.

To illustrate the possibility of adjusting the stroke of connecting rod 50, and thereby of tamper bar 52 mounted at an end 52 of connecting rod 50, FIGS. 2*c* and 2*e* show one exemplary adjusted working position of rotatable eccentric bushing 48 on the eccentric section 47 on tamper shaft 46, and FIGS. 2*d* and 2*f* show another exemplary adjusted working position of rotatable eccentric bushing 48 on the eccentric section 47 on tamper shaft 46. To facilitate understanding of the adjustment of the stroke by rotating eccentric bushing 48, FIGS. 2*c* to 2*f* show the two exemplary adjusted positions of eccentric bushing 48 for an unchanged rotational position of tamper shaft 46.

An adjustment of the stroke of the connecting rod 50 works as follows: As shown in FIGS. 2*c* and 2*e*, a rotational position of eccentric bushing 48 has been rotated relative to the eccentric section 47 on shaft 46 to move an eccentricity of eccentric bushing 48 into a position where it faces an end 52 of connecting rod 50.

In FIGS. 2*d* and 2*f*, eccentric bushing 48 has been rotated relative to the eccentric section 47 on shaft 46 to move the eccentricity of eccentric bushing 48 where it faces away from end 52 of connecting rod 50, thereby adjusting the position of end 52 of connecting rod 50 by an amount of ΔS as indicated by the curly bracket in FIGS. 2*d* and 2*f*.

Since each of FIGS. 2*c* to 2*f* show the eccentric section 47 on tamper shaft 46 in the same rotational position with the eccentricity of eccentric section 47 in the uppermost position, the illustrated adjustment ΔS of the stroke of rod 50 is an adjustment by a distance LS of the uppermost position of the stroke S of rod 50 and therefore of the uppermost position of the corresponding stroke S of tamper bar 42 of tamper device 40.

While FIGS. 2*a* to 2*d* show tamper shaft 46 being mounted in two bearings 97 and 99 being located in two corresponding housing structures 97*a* and 99*a*, a person of ordinary skill in the art will appreciate that tamper shaft 46 may be mounted in additional bearings and housing structures or may be mounted in only one of bearings 97 or 99 in one corresponding housing structure 97*a* or 99*a*. Additionally, a person of ordinary skill in the art will appreciate that the depicted distance between connecting rods 101 and 50, respectively, and an adjacent housing structure 97*a* or 99*a* may be reduced or enhanced as desired. It may for example be enhanced to mount one or more additional connecting rods on tamper shaft 46 between connecting rods 101 and 50, respectively, and an adjacent housing structure 97*a* or 99*a*, if desired.

While in FIGS. 2*a* to 2*f* eccentric sections 47*a* and 47 on shaft 46 are depicted as having a larger diameter than adjacent sections of shaft 46, a person of ordinary skill in the art will appreciate that the eccentric sections 47*a* and 47 may also function to provide eccentricity to shaft 46 when having a smaller diameter than adjacent sections of shaft 46.

Figure 3:
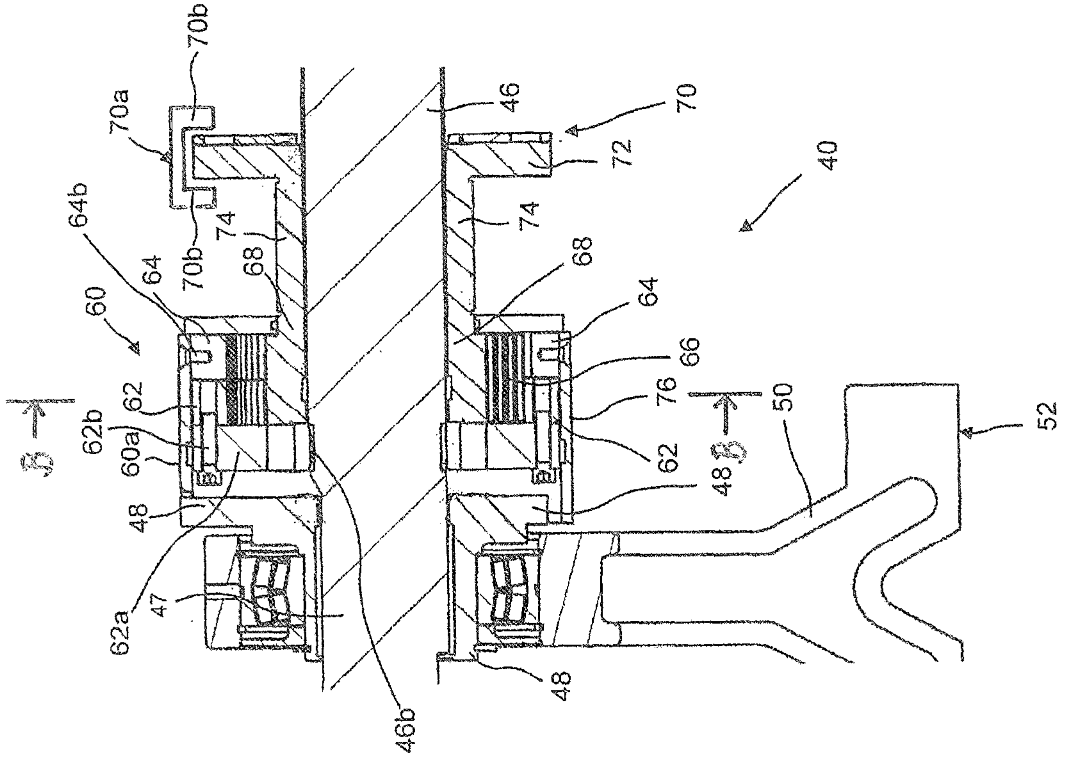
FIG. 3 is a schematic illustration of an exemplary embodiment of the invention.

FIG. 3 is a schematically illustration of an exemplary embodiment of the present invention, in particular provided for illustrating the general principle of the present invention. As shown in FIG. 3, a stroke of connecting rod 50 of tamper device 40 a may be adjusted by a rotational adjustment of a relative rotational positioning between an eccentric bushing 48 and an eccentric section 47 of the tamper shaft 46, while the tamper shaft 46 is running, the rotational adjustment being performed in the way as described in detail with reference to FIGS. 2*c* to 2*f* above.

For providing the rotational adjustment of a relative rotational positioning between bushing 48 and section 47 of shaft 46, the tamper device 40 of this embodiment comprises an inner-toothed hollow wheel gear train 60. The gear train 60 is connected to the tamper shaft 46, to the eccentric bushing 48 and to a drive force receiving element 70. The drive force receiving element 70 is configured to be able to receive a drive force for driving the inner-toothed hollow wheel gear train 60 when the tamper shaft 46 is rotating. In the embodiment of FIG. 3, the inner-toothed hollow wheel gear train 60 is realized as a planetary gear 60*a*.

In the present application the term "inner-toothed hollow wheel gear train" is used for a gear train which comprises at least one inner-toothed hollow wheel. In the present application the term "inner-toothed hollow wheel" is used for a hollow wheel which comprises teeth on its inner surface, FIG. 3 shows examples of such inner-toothed hollow wheels in the form of a shaft side ring gear 62, and a bushing side ring gear 64, both described in detail below. The use of a planetary gear 60*a* as an inner-toothed hollow wheel gear train 60 is an advantage since it is reliable and cost-efficient implementation of an inner-toothed hollow wheel gear train 60. However, a person of ordinary skill in the art will appreciate that other inner-toothed hollow wheel gear trains 60 may be used.

An advantage of the inventive tamper device 40 is that the stroke of the connecting rod 50 driving tamper bar 42 can be adjusted individually and arbitrarily. This is a strong advantage since an individual local position of the screed 18 might require an individual adjustment of the stroke S. If for example a road paver 10 uses more than one screed section, for example a basic screed and optionally screed extensions that can be extended at the basic screed for changing the working width of the road paver 10, each of these components of the screed 18 may comprise its own tamper device 40, so that the present invention enables an individual adjustment of the stroke S for each screed section. Due to the inventive use of an inner-toothed hollow wheel gear train 60 in the inventive tamper device 40 an adjustment of the stroke S can be provided during rotation of the tamper shaft 46. It is therefore in particular not necessary to stop the tamper device 40 to adjust the stroke S. This is a strong advantage since therefore a costly stop of the work of the working paver 10 can be avoided.

The depicted planetary gear 60*a* is a two-stage planetary gear 60*a* and comprises a shaft side ring gear 62 being connected to the tamper shaft 46 in a torque-proof manner. This connection is realized by a disk 62*a* being fitted into a corresponding circumferential recess 46*b* in shaft 46 in a torque-proof manner, and the shaft side ring gear 62 being attached to disk 62*a* by screws 6*b*. Planetary gear 60*a* further comprises a bushing side ring gear 64 being connected to the eccentric bushing 48 in a torque-proof manner. This connection may be realized by a having a shell-like structured housing 76 being integral with the eccentric bushing 48. Not shown, housing 76 may be connected to the eccentric bushing 48 in a torque-proof manner for example by also using a screw connection. The bushing side ring gear 64 is attached to the housing 76 by screws 64*b*.

Planetary gear 60*a* further comprises a common planet gear 66 connecting the shaft side ring gear 62 with the bushing side ring gear 64. This connection is realized by meshing with both of gears 62 and 64 in a way know to a person of ordinary skill in the art. Planetary gear 60*a* further comprises a common sun gear 68 being connected to the drive force receiving element 70 in a torque-proof manner. This connection may be realized by a having a tube 74 surrounding shaft 46 and being integral with the disk-shaped drive force receiving element 70 and the central sun gear 68.

Therefore, while housing 76 serves as a shell for the shaft side ring gear 62, the bushing side ring gear 64, the planet gear 66, and the sun gear 68, only the shaft side ring gear 62, the planet gear 66, and the sun gear 68 are rotatable relative to the housing 76. The eccentric bushing 48 and the bushing side ring gear 64 are fixed to or integral with the housing 76 in a torque-proof manner.

By providing the housing 76 for the gears 62, 64, 66, 68 and by simultaneously connecting the housing 76 to the eccentric bushing 48 of the tamper shaft 46 in a torque-proof manner it is provided a simple and reliable protection of the gears 62, 64, 66, 68 in a possibly rough environment when the inventive tamper device 40 is for example used on a road paver 10, while simultaneously the housing 76 is simply also part of the second stage or the output side of such planetary gear 60*a*.

Figure 3A:
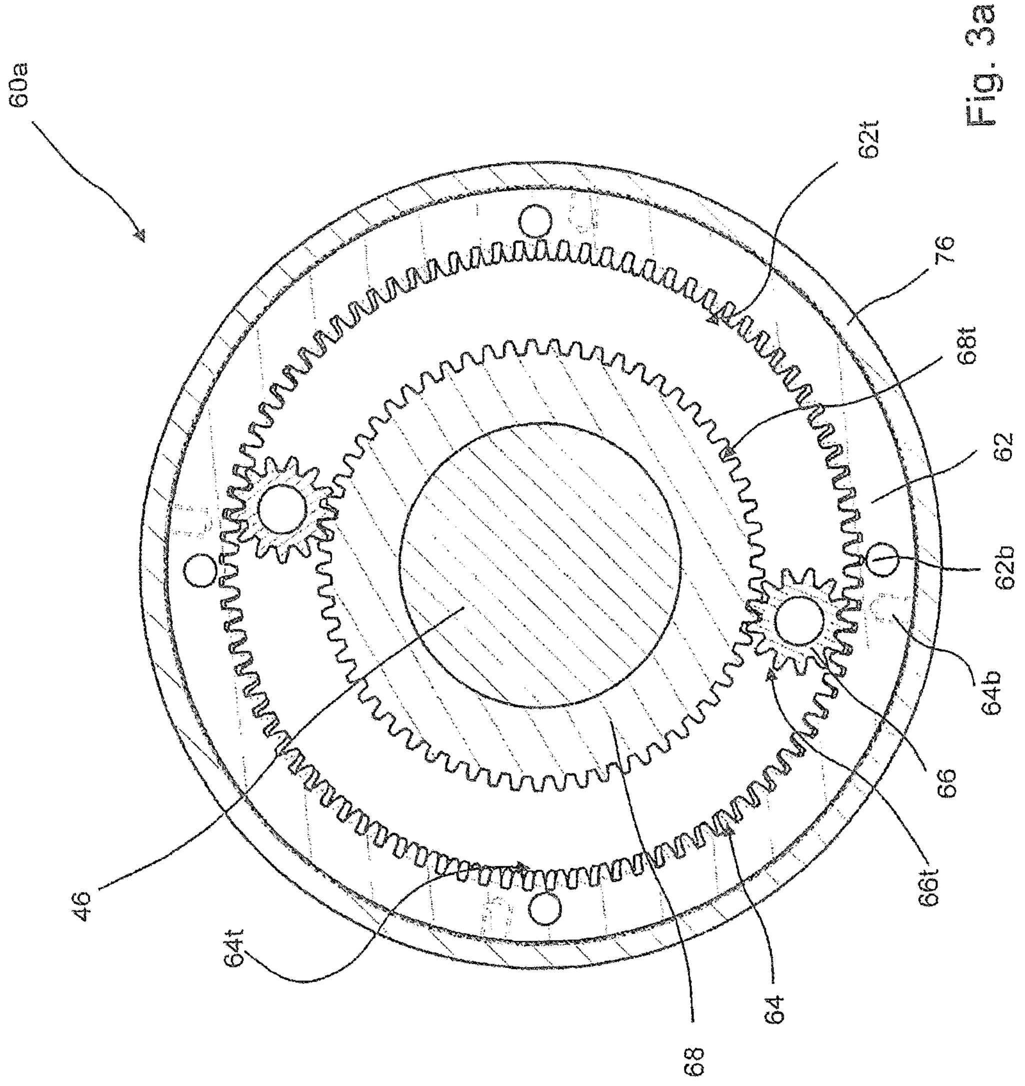
FIG. 3*a* is a cross section though the shaft side ring gear along plane B-B in FIG. 3.

For further details of the structure of planetary gear 60*a* and of the interaction of gears 62, 64, 66 and 68 of planetary gear 60*a* it is also referred to FIG. 3*a* showing a cross section through gears 62, 66 and 68 along plane B-B in FIG. 3 and using dashed lines to show gear 64 not in the sectional plane B-B.

As can be seen in FIG. 3*a*, the shaft side ring gear 62 comprises 89 teeth 62*t*, the bushing side ring gear 64 shown in dashed lines comprises 87 teeth 64*t*, the planet gear 66 comprises 13 teeth 66*t*, and the sun gear 68 comprises 62 teeth 68*t*. Such ratio has been found as being particularly useful for the requirements of road pavers 10. In particular, the shaft side ring gear 62 comprises more teeth 62*t* than the bushing side ring gear 64.

According to an alternative, not shown embodiment a ratio of a number of teeth 62*t* of the shaft side ring gear 62 to a number of teeth 64*t* of the bushing side ring gear 64 is about 30:1 to about 250:1. According to a further alternative, not shown embodiment the shaft side ring gear 62 comprises less teeth 62*t* than the bushing side ring gear 64. According to a further alternative, not shown embodiment a ratio of a number of teeth 62*t* of the shaft side ring gear 62 to a number of teeth 64*t* of the bushing side ring gear 64 should be about 1:30 to about 1:250. Such ranges of ratios have been found as being particularly useful for the requirements of road pavers 10.

As shown in FIG. 3, the drive force receiving element 70 is configured as a disk-like brake force receiving element being configured to be able to receive a brake force for driving the planetary gear 60*a* when the tamper shaft 46 is rotating. Such brake force may be applied by a mechanical brake 70*a* shown in simplified form and comprising brake shoes 70*b* which can be moved laterally against the disk-like drive force receiving element 70. For that purpose the brake force receiving element comprises a disk-like adjustment wheel 72 sitting on the tamper shaft 46. The adjustment wheel 72 is rotatable relative to the tamper shaft 46. Since the adjustment wheel 72 is connected to the sun gear 68 in a torque-proof manner via connecting tube 74, the adjustment wheel 72 is configured and enabled to drive the eccentric bushing 48 in a direction against a direction of rotation of the tamper shaft 46, in case the adjustment wheel 72 is receiving a brake force when the tamper shaft 46 is rotating.

An adjustment of the stroke of the connecting rod 50 while the tamper shaft 46 is rotating, works as follows: Providing a certain brake force to the adjustment wheel 72 causes a corresponding reduction of the rotational speed of the adjustment wheel 72. Since the adjustment wheel 72 can rotate relative to the tamper shaft 46, this also causes a corresponding reduction of the rotational speed of the adjustment wheel 72 relative to an unchanged rotational speed of the tamper shaft 46. Since sun gear 68 is integral with adjustment wheel 72 via tube 74, this also causes a corresponding reduction of the rotational speed of the sun gear 68 relative to the rotational speed of the tamper shaft 46.

Since the tamper shaft 46 is fixed to the shaft side ring gear 62, this causes also a corresponding reduction of the rotational speed of the sun gear 68 relative to the rotational speed of the shaft side ring gear 62.

Since the sun gear 68 is connected with the shaft side ring gear 62 via the planet gear 66, this causes the planet gear 66 to move between sun gear 68 and shaft side ring gear 62. Since the planet gear 66 extending into the bushing side ring gear 64, also, and since the bushing side ring gear 64 has less teeth 64*t* than the shaft side ring gear 62, the planet gear 66 forces the bushing side ring gear 64 into a rotation relative to the shaft side ring gear 62.

Since the bushing side ring gear 64 is fixed to eccentric bushing 48, this causes a corresponding rotation of eccentric bushing 48. As discussed above, a rotation of eccentric bushing 48 causes a corresponding adjustment of the stroke S of connecting rod 50.

Preferably, a shaft eccentricity of the eccentric section 47 and a bushing eccentricity of the eccentric bushing 48 are configured so that the stroke is adjustable between a predefined minimum, e.g. zero, and a predefined maximum. Preferably, if the predefined minimum is zero, this embodiment provides the possibility to not only arbitrarily adjust the stroke S between a predefined non-zero minimum and a predefined maximum but to adjust the stroke S even to zero. Such a possibility may be useful in particular if a screed 18 uses two parallel tamper bars 42, 44, for example one tamper bar 42 being mounted at the ends 52 of two connecting rods 50 having an adjustable stroke S according to the present invention, and another tamper bar 44 having a fixed stroke. By a minimum stroke being zero it would then be possible to adjust the stroke of the upstream tamper bar 42 to zero, if for example the impact of the stroke S of the second downstream tamper bar 44 would be sufficient for a certain working condition of a respective road paver 10.

By providing a brake force receiving element 70 receiving a brake force for driving the gear 60*a* it is not only possible to provide the rotational adjustment of a relative rotational positioning between the eccentric bushing 48 and the eccentric section 47 while the tamper shaft 46 is rotating or running, but it is additionally possible to use the rotational energy of the rotating tamper shaft 46 for driving the inventive gear train 60*a*. By for example connecting the brace force receiving element 70 with the input side of the inventive gear train 60*a* as described above the brake force receiving element 70 may simply rotate together with the whole gear train 60*a* which itself is rotating together with the tamper shaft 46 due to its connection to the tamper shaft 46. Only if an adjustment of the relative rotational positioning between the eccentric bushing 48 and the eccentric section 47 for an adjustment of the stroke S is desired, a brake force is provided to the brake force receiving element 70 connected with sun gear 68 on the input side of the inventive gear train 60*a* to drive the inventive gear train 60*a* and to thereby provide the rotational adjustment of a relative rotational positioning between the eccentric bushing 48 and the eccentric section 47 of running shaft 46. By using an adjustment wheel 72 rotatable sitting on tamper shaft 46, a simple and cost-efficient implementation of a brake force receiving element 70 is provided. By connecting the adjustment wheel 72 with the sun gear 68 of a planetary gear 60*a* as described above a simple and cost-efficient implementation of a connection between the adjustment wheel 72 and a planetary gear 60*a* is provided since the sun gear 68 is the inner most part of a planetary gear 60*a* so that it is in particular simple to for example use a connecting tube 74 as discussed above to connect adjustment wheel 72 and sun gear 68.

Figure 4A:
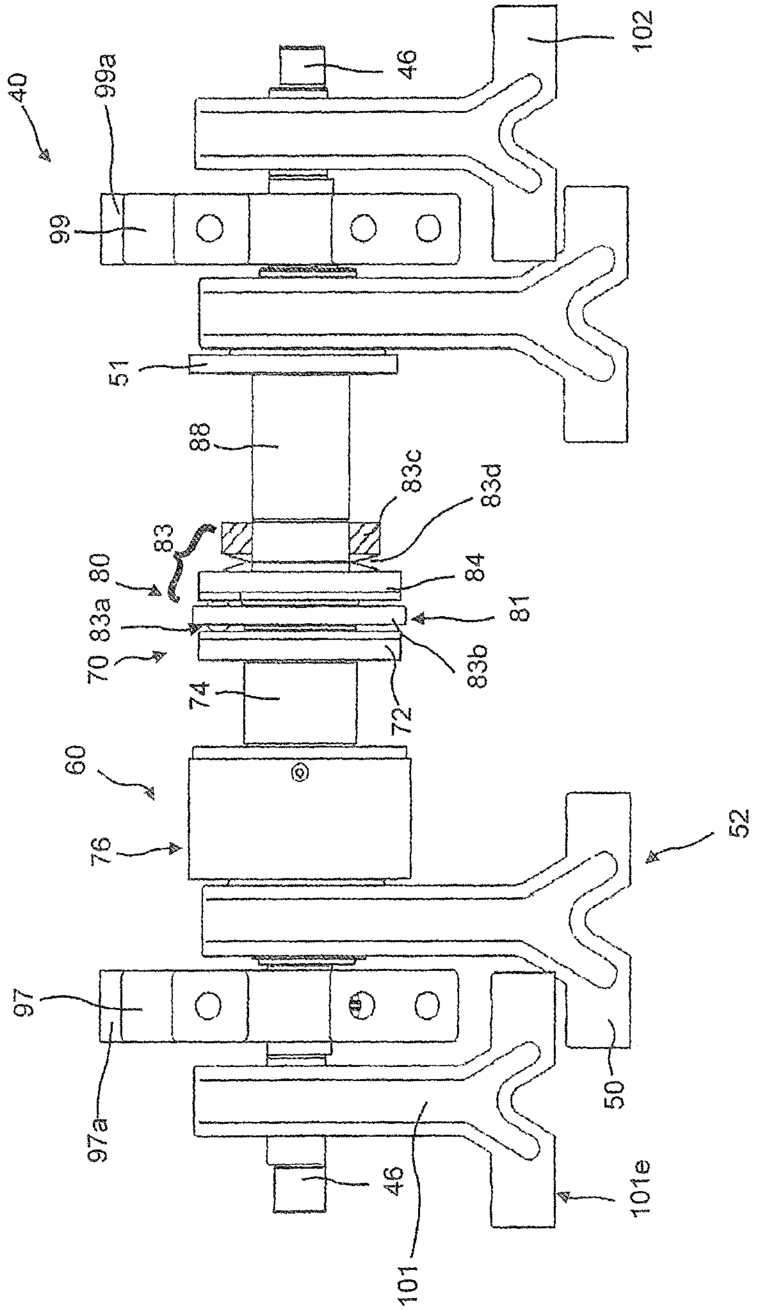
FIG. 4*a* is an illustration of another embodiment of the present invention.

FIG. 4*a* is an illustration of another embodiment of the present invention. As shown in FIG. 4*a*, tamper device 40 comprises a second set of non-adjustable connecting rods 101, 102 which may be connected with the downstream tamper bar 44 of the screed 18 of FIG. 1 as described above. FIG. 4*a* also comprises a further brake force receiving element 80 being connected with the brake force receiving element via a gear unit 81. The further brake force receiving element 80 is configured to be able to receive a brake force for driving the gear unit 81 by comprising a further adjustment wheel 84 sitting on the tamper shaft 46. The further adjustment wheel 84 is rotatable relative to the tamper shaft 46, whereby the further adjustment wheel 84 is configured to drive the adjustment wheel 72 in a direction of rotation of the tamper shaft 46, in case the further adjustment wheel 84 is receiving a brake force when the tamper shaft 46 is rotating.

Figure 4B:
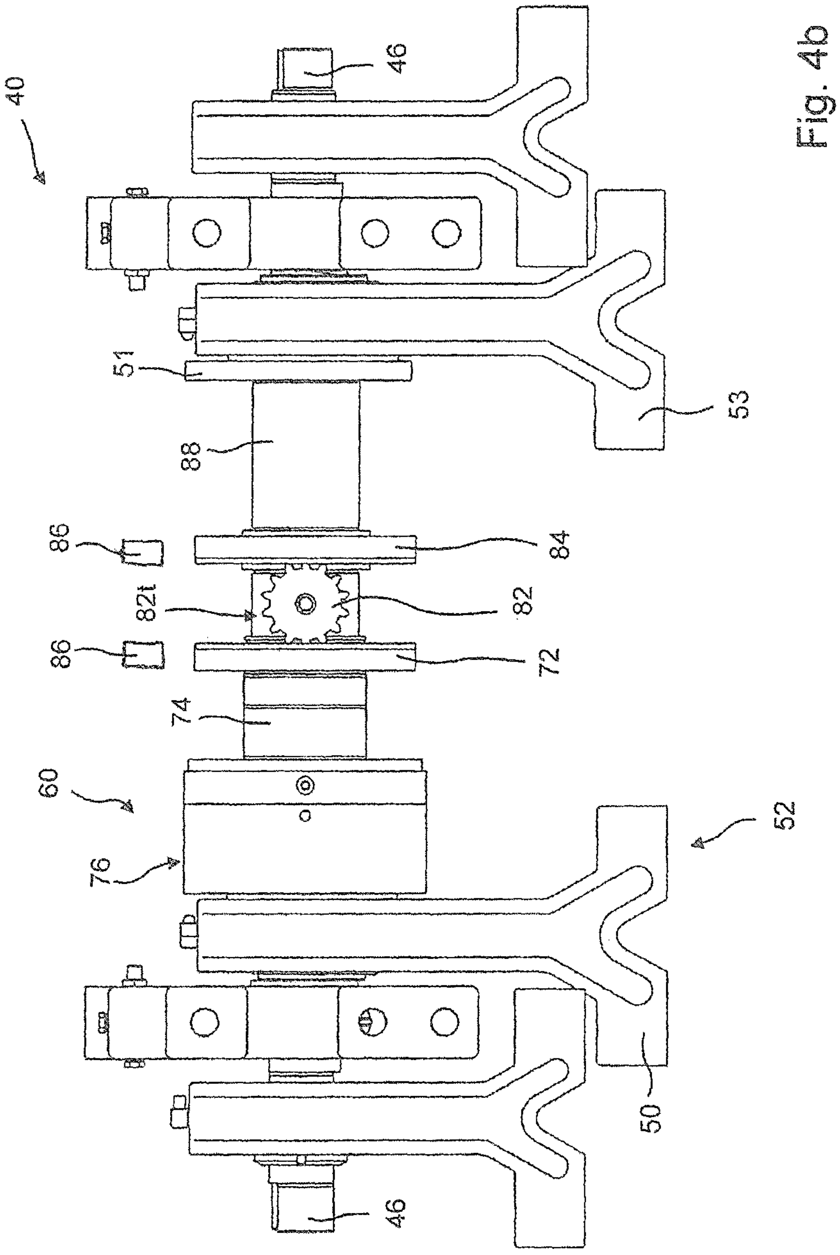
FIG. 4*b* is an illustration of another embodiment according to the present invention.
Figure 5:
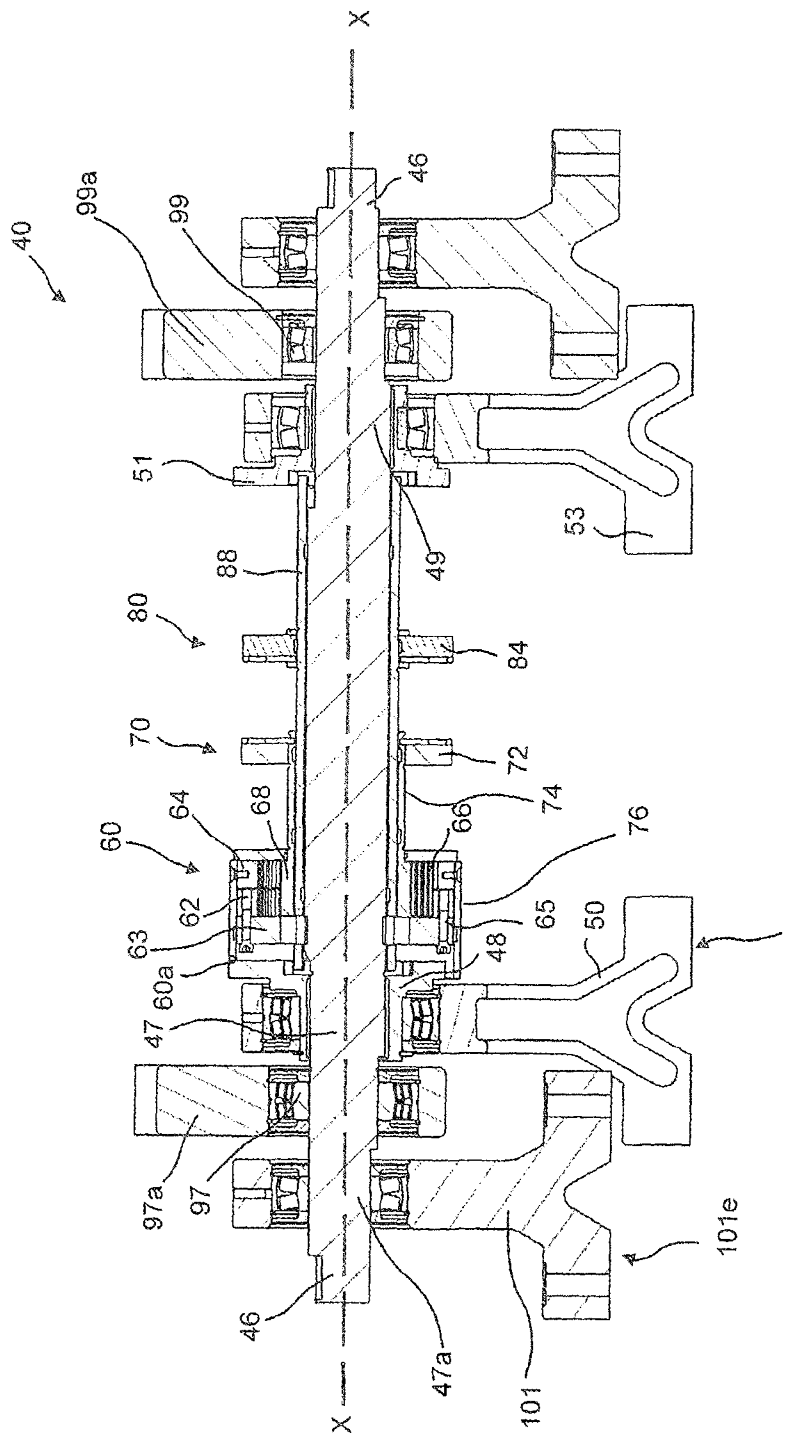
FIG. 5 shows a cross-sectional view of the embodiment according to FIG. 4*b;*

As shown in FIG. 4*a* the gear unit 81 comprises a friction gear 83. The friction gear 83 comprises at least one ball 83*a* which connects adjustment wheel 72 with further adjustment wheel 80 in a force-fit manner. The at least one ball 83*a* is held rotatable in a central gear element 83*b* which is fixedly mounted on tamper shaft 46 or tube 88, see FIG. 5 showing a cross-sectional view of FIG. 4*b*. Additionally, friction gear 83 comprises a biasing element 83*c* which can be axially moved along tamper shaft 46 and which can be fixed in a desired biasing position on tamper shaft 46 to provide a biasing force via a spring 83*d* to the further adjustment wheel 84.

The embodiment of FIGS. 4*a* and 5 works as follows: In case a brake force is applied to the further adjustment wheel 84, for example by a mechanical brake, or for example induced in the further adjustment wheel 84 by an eddy current brake 86 as shown in FIG. 4*b*, the further adjustment wheel 84 will be slowed down in its rotational velocity in relation to the rotational velocity of the tamper shaft 46. This causes a rotation of the ball 83*a* being in friction-fit contact with the further adjustment wheel 84. Since for example a rotation of the ball 83*a* into the paper plane of FIG. 4*a* on the right hand side of gear element 83*b* means a rotation of ball 83*a* out of the paper plane of FIG. 4*a* on the left hand side of gear element 83*b*, the adjustment wheel 72 is forced by ball 83*a* to rotate in the same direction as the tamper shaft 46. This causes a respective rotation of the eccentric bushing 48 and therefore results in an adjustment of the stroke S of connecting rod 50 and a corresponding tamper bar as discussed above.

In case a friction force by eddy current brake 86 is induced in the adjustment wheel 72, ball 83*a* will also translate this in an anti-rotation of the further adjustment wheel 84. This however has no consequence for the stroke of the tamper device 40 since such a rotation only causes a rotation of the further adjustment wheel 84 which is not connected to any bushing.

According to another embodiment shown in FIG. 4*b* the gear unit 81 comprises a cog wheel 82 replacing the friction gear 83 of FIG. 4*a*. The cog wheel 82 is sitting on a laterally extending projection and can rotate in the paper plane of FIG. 4*b*. The cog wheel 82 is meshing with its teeth 82*t* in corresponding openings in both adjustment wheels 72 and 84.

The embodiment of FIG. 4*b* works as follows: In case a brake force is applied to the further adjustment wheel 84, the further adjustment wheel 84 will be slowed down in its rotational velocity in relation to the rotational velocity of the tamper shaft 46. This causes a rotation of the cog wheel 82. This causes the adjustment wheel 72 to rotate. This causes a respective rotation of the eccentric bushing 48 as discussed above and therefore results in an adjustment of the stroke S of connecting rod 50 and a corresponding tamper bar as discussed above.

By providing a further brake force receiving element, e.g. in form of a further adjustment wheel 84, in addition to the brake force receiving element 70, and by connecting the further brake force receiving element with the brake force receiving element 70 via a gear unit 81, it is advantageously possible to provide a brake force to the further adjustment wheel 84 which brake force is then translated by the gear unit 81 so that the adjustment wheel 72 can be rotated in the same direction as the rotation direction of the tamper shaft

46. Accordingly, it is possible by using two adjustment wheels 72, 84 connected via gear unit 81 to either brake on the adjustment wheel 72 to drive the eccentric bushing 48 in a direction against a direction of rotation of the tamper shaft 46, or to brake on the further adjustment wheel 84 so that its rotation is slowed down with respect to the rotation of the tamper shaft 46, this slowing down of the further adjustment wheel 84 being translated by the gear unit 81 into an acceleration of the adjustment wheel 72 which drives the eccentric bushing 48 in a direction of rotation of the tamper shaft 46. With other words: By the present embodiment the direction of rotational adjustment of a relative rotational positioning between the eccentric bushing 48 and the eccentric section 47 can be chosen by selecting either the adjustment wheel 72 or the further adjustment wheel 84 to be braked on. Thereby a necessity to provide a rotational adjustment of a relative rotational positioning between the eccentric bushing 48 and the eccentric section 47 of more than 180° is advantageously avoided. Accordingly, an adjustment on the basis of this embodiment substantially reduces the average time for rotational adjustment.

According to the embodiment of FIGS. 4*b* and 5 the tamper shaft 46 comprises a further eccentric section 49 with a further eccentric bushing 51 mounted on the further eccentric section 49, and a further connecting rod 53 being rotatable mounted on the further eccentric bushing 51 for being driveable with stroke motions having a stroke. The stroke is adjustable by an rotational adjustment of a relative rotational positioning between the further eccentric bushing 51 and the further eccentric section 49 in the same fashion as discussed above with respect to connecting rod 50.

By this embodiment it is possible to in parallel adjust the stroke S of the connecting rod 50 and the further connecting rod 53 by connecting the eccentric bushings 48, 51 of each of the connecting rods 50, 53 so that a relative rotational positioning of the eccentric bushing 48 according to the present invention causes a parallel additional positioning of the further eccentric bushing 51.

As shown in FIG. 5, the eccentric bushing 48 and the further eccentric bushing 51 are connected in a torque-proof manner by an elongated tube 88 surrounding the tamper shaft 46 between the eccentric bushing 48 and the further eccentric bushing 51.

As can be seen in FIG. 5, the elongated tube 88 is mounted at each bushing 48, 51 with lateral play to compensate a lateral movement of the bushings 48, 51 due to the eccentricity of the respective eccentric sections 47, 49 on the tamper shaft 46 when the stroke being adjusted by an rotational adjustment of a relative rotational positioning between the eccentric bushings 48, 51 and the eccentric sections 47, 48.

By mounting the elongated tube 88 connecting the eccentric bushing 48 with the further eccentric bushing 51 at each bushing 48, 51 with lateral play, this embodiment advantageously compensates a lateral movement of the bushings 48, 51 due to the eccentricity of the respective eccentric sections 47, 49 on the tamper shaft 46 when the stroke S being adjusted by an rotational adjustment of a relative rotational positioning between the eccentric bushings 48, 51 and the eccentric sections 47, 49 of the tamper shaft 46.

Figure 6:
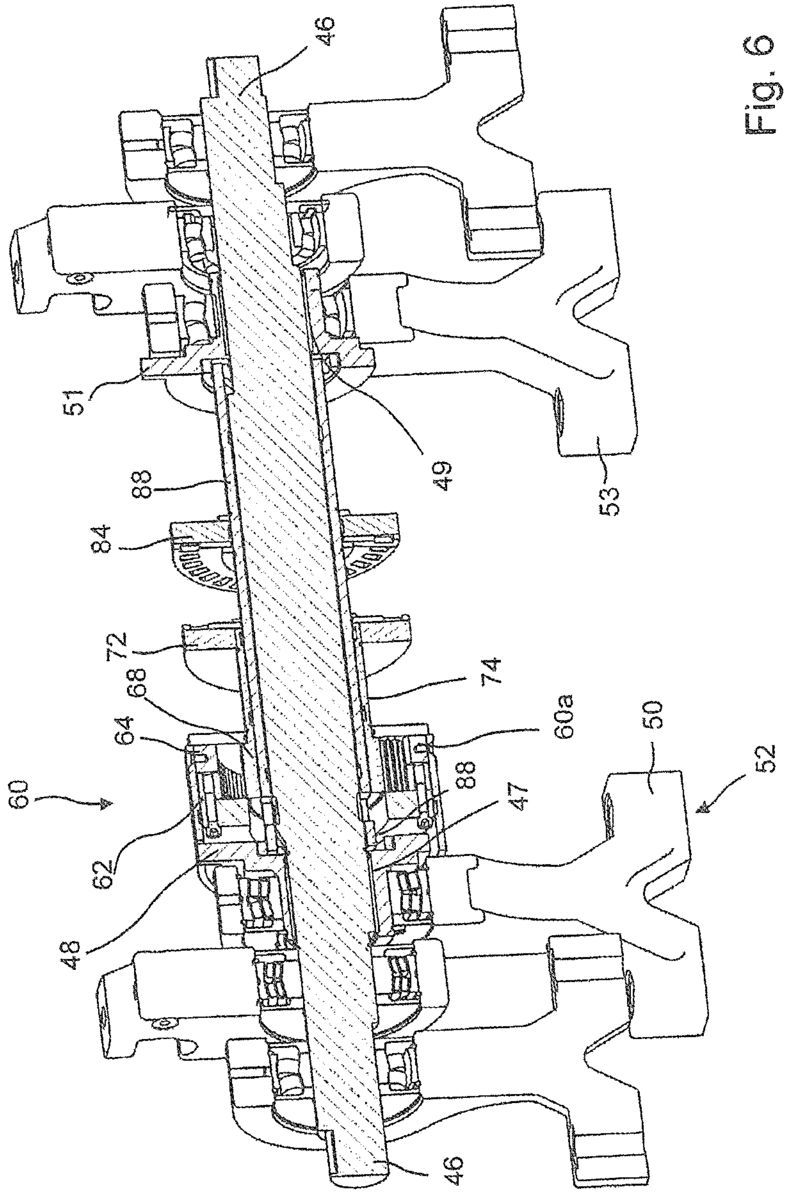
FIG. 6 is a perspective view of FIG. 5.
Figure 7:
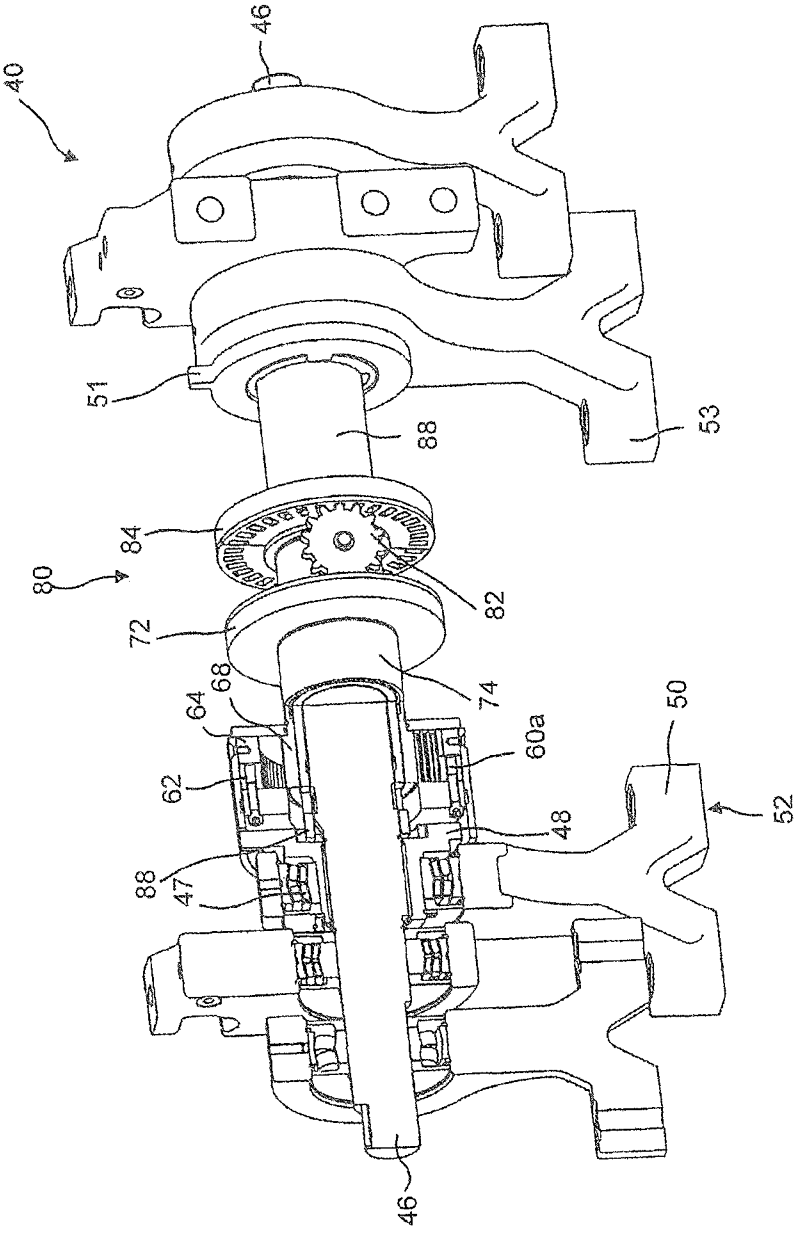
FIG. 7 corresponds to FIG. 6 but does only show a partial cross-section.
Figure 8:
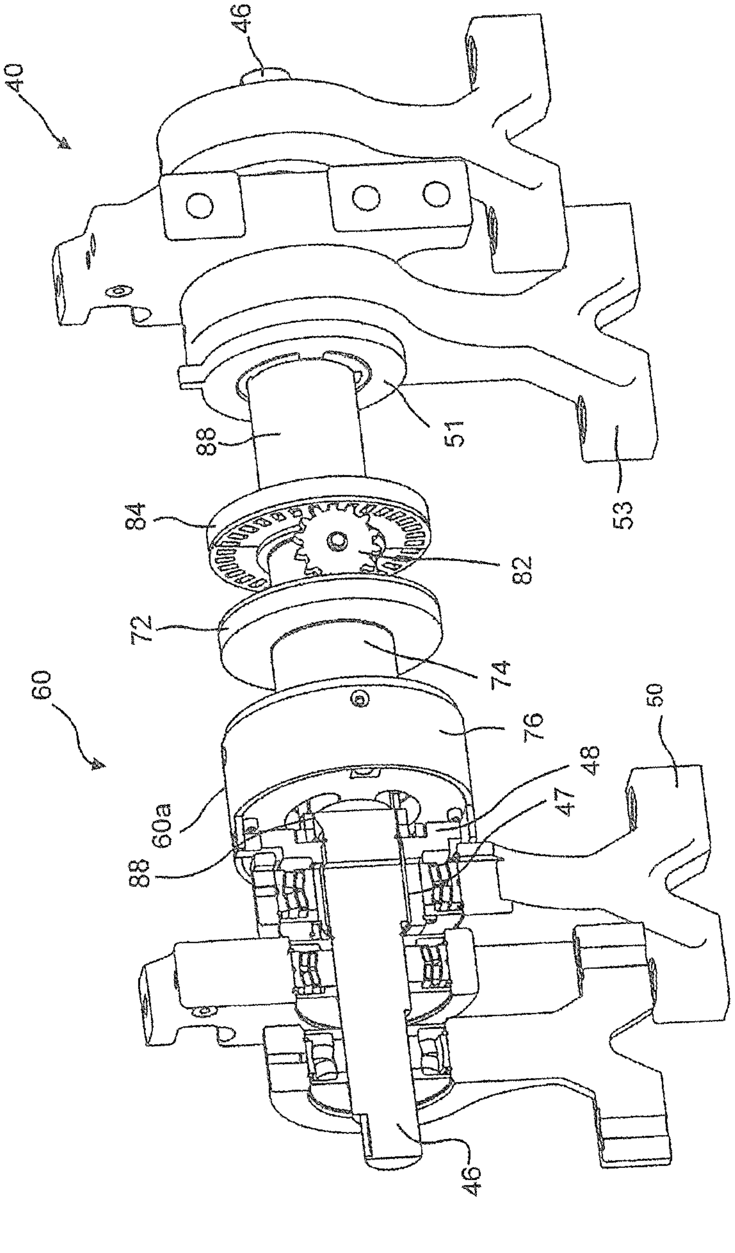
FIG. 8 corresponds to FIG. 7 with a reduced cross-sectional part.

FIG. 6 is a perspective view of FIG. 5. FIG. 7 corresponds to FIG. 6 but does only show a partial cross-section. FIG. 8 corresponds to FIG. 7 but the part showing the cross-section has even further being reduced.

Figure 9:
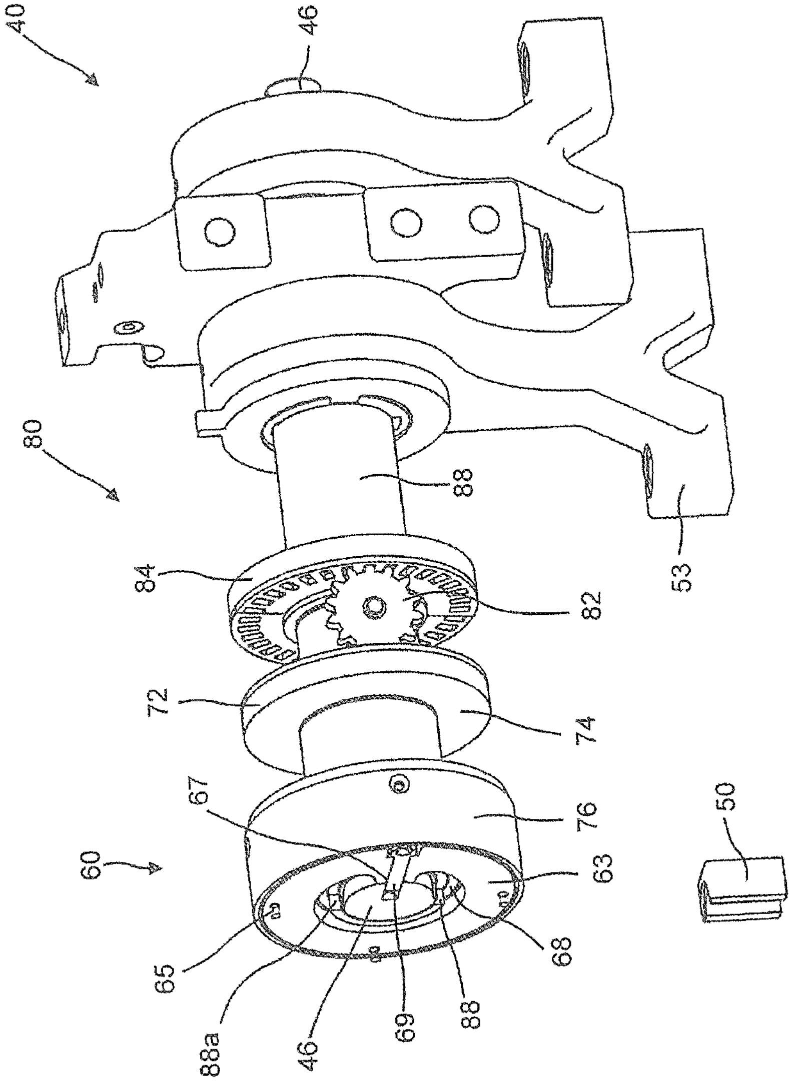
FIG. 9 corresponds to FIG. 8 but shows part of FIG. 8 cut away.

FIG. 9 corresponds to FIG. 8 but shows only a part of FIG. 8 in that a cut through the housing 76 of the gear train 60 has been performed and everything left of the cut has been omitted to have a view on elements of the gear train 60 in the housing 76. As also indicated in FIG. 5 a hollow ring 63 is fixedly mounted in a torque-proof manner to tamper shaft 46. Additionally, the hollow ring 63 is fixedly connected by screws 65 with the shaft side ring gear 62 so that the shaft side ring gear 62 is therefore also fixedly connected in a torque-proof manner with tamper shaft 46. As in particular can be seen in FIG. 9, the hollow ring 63 carries a projection 67 radially pointing to the tamper shaft 46 and being in contact with the surface of tamper shaft 46 and also been fixedly connected by a radially mounted screw 69 to the tamper shaft 46 in a torque-proof manner.

Figure 10B:
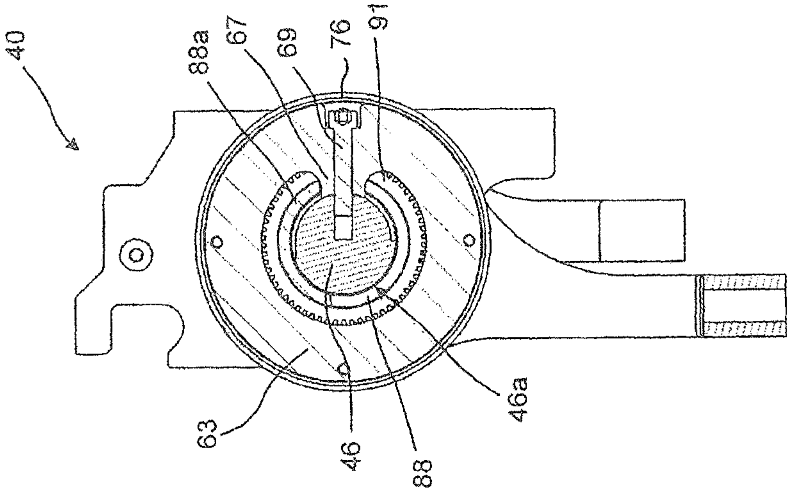
FIGS. 10*a* and 10*b* are side views from left to right in FIG. 9 on the left hand side of the device of FIG. 9.
Figure 10A:
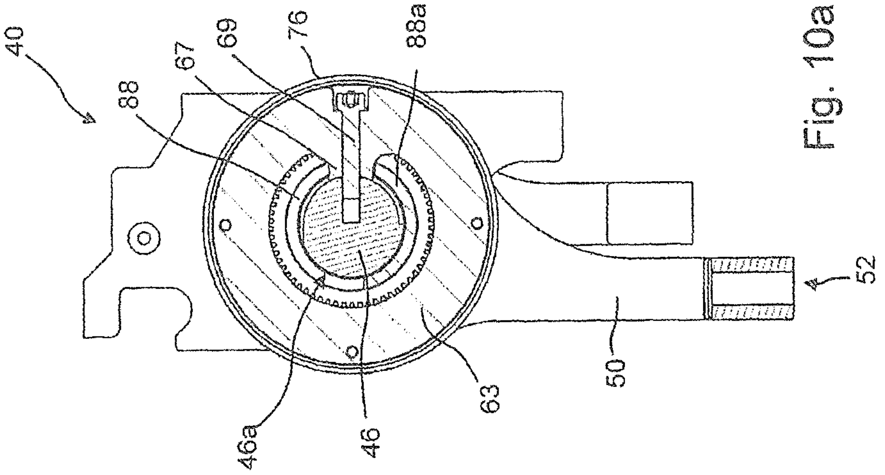

As can be seen in respective side views of FIG. 9, depicted in FIGS. 10*a* and 10*b*, elongated connecting tube 88 carries a projection 88*a* extending in axial direction of tamper shaft 46 into an opening 91 where the projection 67 of hollow ring 63 does not have contact with tamper shaft 46 but radially is spaced from the surface 46*a* of tamper shaft 46. As can be seen in FIG. 9 the projection 88*a* has a circumferential extension of about half the circumference of the tube 88. Due to the projection 88*a* into the opening 91 between hollow ring 63 and tamper shaft 46 at the axial position of projection 67, tube 88 can only be rotated between the tube positions shown in FIGS. 10*a* and 10*b*.

An alternative, not shown embodiment comprises an electric motor, and the drive force receiving element 70 of the afore-mentioned embodiments is configured to be driven by the electric motor. By using an electric motor, the drive force receiving element 70 can receive a drive force for driving the inner-toothed hollow wheel gear train 60 when the tamper shaft 46 is rotating, as well as when the tamper shaft 46 is standing still.

According to an alternative, not shown embodiment the inner-toothed hollow wheel gear train 60 of the afore-mentioned embodiments comprises a strain wave gear. Preferably, such strain wave gear comprises a circular spline being connected to the tamper shaft 46 in a torque-proof manner, a flex spline being connected to the eccentric bushing 48 in a torque-proof manner, and a drive element for moving the flex spline and being connected to the drive force receiving element 70 in a torque-proof manner.

In case the drive force receiving element 70 of this embodiment comprises a brake force receiving element being configured to be able to receive a brake force for driving the strain wave gear when the tamper shaft 46 is rotating, the brake force receiving element may be configured to be able to receive a brake force by comprising an adjustment wheel 72 sitting on the tamper shaft 46, the adjustment wheel 72 being rotatable relative to the tamper shaft 46, and the adjustment wheel 72 being connected to the flex spline in a torque-proof manner, preferably via a connecting tube 74 surrounding the tamper shaft 46, whereby the adjustment wheel 72 is being configured to drive the eccentric bushing 48 in a direction against a direction of rotation of the tamper shaft 46, in case the adjustment wheel 72 is receiving a brake force when the tamper shaft 46 is rotating.

The use of a strain wave gear as gear 60, also known as a harmonic gear or harmonic drive, provides the advantages of nearly no backlash, enhanced compactness, reduced weight, high gear ratios, reconfigurable ratios within the same housing, enhance resolution and excellent repeatability when repositioning initial loads, and a high torque capability. In particular, the use of a strain wave gear provides high gear reduction ratios in a small volume. As an example, it is possible to realize a gear reduction ratio from 30:1 up to 320:1 in the same space in which a normal planetary gear 60*a* typically produces a reduction ratio of 10:1.

Figure 11:
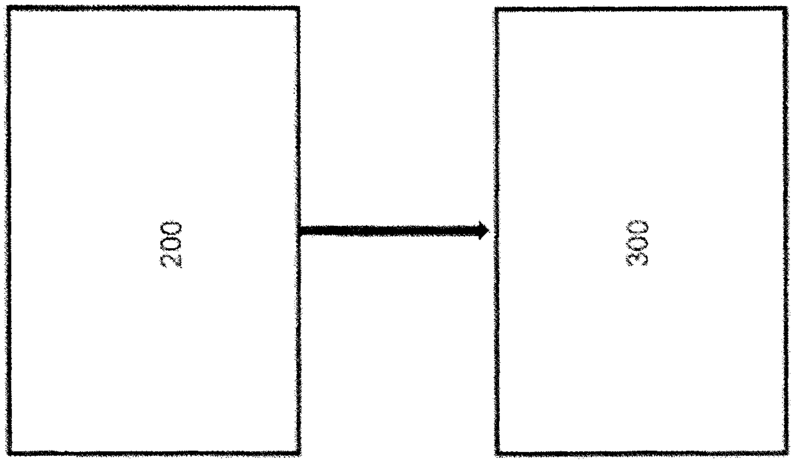
FIG. 11 is a schematic illustration of an inventive method.

According to a second aspect of the present invention, FIG. 11 shows a schematic illustration of an embodiment of a method for adjusting a stroke of a tamper device 46 for a screed 18 of a road paver 10. The tamper device 40 comprises a rotatable driveable tamper shaft 46 comprising an eccentric section 47, an eccentric bushing 48 mounted on the eccentric section 47, and a connecting rod 50 being rotatable mounted on the eccentric bushing 48 for being driveable with stroke motions having a stroke, the stroke being adjustable by an rotational adjustment of a relative rotational positioning between the eccentric bushing 48 and the eccentric section 47. The method comprises the step 300 of providing the rotational adjustment by driving an inner-toothed hollow wheel gear train 60 by the step 200 of providing a drive force to a drive force receiving element 70. The drive force receiving element 70 is connected to the inner-toothed hollow wheel gear train 60. The drive force receiving element 70 is configured to be able to receive the drive force for driving the inner-toothed hollow wheel gear train 60 when the tamper shaft 46 is rotating. The inner-toothed hollow wheel gear train 60 is also connected to the tamper shaft 46 and to the eccentric bushing 48.

Preferably, when executing the method, the method can comprise the further step of measuring an angle of the relative rotational positioning between the eccentric bushing 48 and the eccentric section 47. Hereby an exact information about the relative rotational positioning between the eccentric bushing and the eccentric section can be retrieved.

Preferably, when executing the method, the method can comprise the further step of using the measured angle of the relative rotational positioning to define the amount of rotational adjustment of the relative rotational positioning between the eccentric bushing 48 and the eccentric section 47. Hereby a precise adjustment of the relative rotational positioning between the eccentric bushing 48 and the eccentric section 47 and thereby a precise determination of the stroke S can be achieved. This possibility is particularly advantageous if such method is for example used in combination with a measurement of a laid material thickness of the material paved by paver 10, and/or of a measurement of compaction of the material paved by paver 10, so that the stroke S can immediately be adjusted on the basis of the measured parameters of material thickness and/or compaction and the actual stroke derived from the actually measured angle of the relative rotational positioning as mentioned above.

Preferably, when executing the method, at least one computer program may be used, the at least one computer program comprising program code means for performing the steps of the method for adjusting a stroke of a tamper device 40 for a screed 18 of a working machine as described herein, when said program is run on at least one computer.

A computer readable medium can be provided, the computer readable medium carrying at least one computer program comprising program code means for performing the steps of the method for adjusting a stroke of a tamper device 40 for a screed 18 of a working machine as described herein, when said program product is run on at least one computer.

As shown in FIG. 1, a control unit 100 can be provided for controlling a tamper device 40 for a screed 18 of a working machine, in particular a paver 10, the control unit 100 being configured to perform the steps of the method for adjusting a stroke of a tamper device 40 for a screed 18 of a working machine as described herein.

Preferably, the control unit 100 comprises a mechanical and/or electrical sensor for measuring an angle of the relative rotational positioning between the eccentric bushing 48 and the eccentric section 47.

The present invention also relates to a working machine, in particular a road paver 10, comprising a control unit 100 as described herein.

It is to be understood that the present invention is not limited to the embodiments described above and illustrated in the drawings; rather, the skilled person will recognize that many changes and modifications may be made within the scope of the appended claims.

The invention claimed is:

1. A tamper device for a screed of a working machine comprising a paver, the tamper device comprising:

a rotatable driveable tamper shaft comprising an eccentric section, an eccentric bushing mounted on the eccentric section, a connecting rod being rotatable mounted on the eccentric bushing for being driveable with stroke motions having a stroke, the stroke (S) being adjustable by a rotational adjustment of a relative rotational positioning between the eccentric bushing and the eccentric section, an inner-toothed hollow wheel gear train for providing the rotational adjustment, the gear train being connected to the tamper shaft, to the eccentric bushing, and to a drive force receiving element configured to receive a drive force for driving the inner-toothed hollow wheel gear train when the tamper shaft is rotating.

2. The tamper device of claim 1, wherein the inner-toothed hollow wheel gear train comprises a planetary gear.

3. The tamper device of claim 2, wherein the planetary gear is a two-stage planetary gear and comprises a shaft side ring gear being connected to the tamper shaft in a torque-proof manner, a bushing side ring gear being connected to the eccentric bushing in a torque-proof manner, a common planet gear connecting the shaft side ring gear with the bushing side ring gear, and a common sun gear being connected to the drive force receiving element in a torque-proof manner.

4. The tamper device of claim 3, further comprising a housing for the shaft side ring gear, the bushing side ring gear, the planet gear, and the sun gear, the housing being connected to the eccentric bushing in a torque-proof manner, the bushing side ring gear being connected to the housing in a torque-proof manner, whereas the shaft side ring gear, the planet gear, and the sun gear being rotatable relative to the housing.

5. The tamper device of claim 3, wherein the shaft side ring gear comprises less teeth than the bushing side ring gear, preferably a ratio of a number of teeth of the shaft side ring gear to a number of teeth of the bushing side ring gear being about 1:30 to about 1:250; or the shaft side ring gear comprises more teeth than the bushing side ring gear, preferably a ratio of a number of teeth of the shaft side ring gear to a number of teeth of the bushing side ring gear being about 30:1 to about 250:1;

wherein the shaft side ring gear comprises 87 teeth and the bushing side ring gear (64) comprises 89 teeth, the planet gear comprises 13 teeth, and the sun gear comprises 62 teeth.

6. The tamper device of claim 1, wherein the drive force receiving element comprises a brake force receiving element being configured to be able to receive a brake force for driving the inner toothed hollow wheel gear train when the tamper shaft is rotating.

7. The tamper device of claim 6, wherein the brake force receiving element is configured to be able to receive a brake force by an adjustment wheel sitting on the tamper shaft, the adjustment wheel being rotatable relative to the tamper shaft, and the adjustment wheel connected to the inner toothed hollow wheel gear train in a torque-proof manner, preferably the adjustment wheel being connected to the sun gear in a torque-proof manner via a connecting tube surrounding the tamper shaft, whereby the adjustment wheel is configured to drive the eccentric bushing in a direction against a direction of rotation of the tamper shaft when the adjustment wheel is receiving a brake force when the tamper shaft is rotating.

8. The tamper device of claim 6, comprising a further brake force receiving element connected with the brake force receiving element via a gear unit, the further brake force receiving element being configured to receive a brake force for driving the gear unit by a further adjustment wheel sitting on the tamper shaft, the further adjustment wheel being rotatable relative to the tamper shaft, whereby the further adjustment wheel is configured to drive the adjustment wheel in a direction of rotation of the tamper shaft when the further adjustment wheel is receiving a brake force when the tamper shaft is rotating.

9. The tamper device of claim 8, the gear unit comprising at least one of a cog wheel and a friction gear.

10. The tamper device of claim 6, comprising at least one of a mechanical brake and an eddy current brake for providing a brake force to the brake force receiving element and/or the further brake force receiving element.

11. The tamper device of claim 1, further comprising a tamper bar mounted at an end of the connecting rod.

12. The device of claim 1, wherein a shaft eccentricity of the eccentric section and a bushing eccentricity of the eccentric bushing are configured so that the stroke is adjustable between a predefined minimum, and a predefined maximum.

13. The tamper device of claim 1, wherein the tamper shaft comprises a further eccentric section with a further eccentric bushing mounted on the further eccentric section, and a further connecting rod being rotatable mounted on the further eccentric bushing for being driveable with stroke motions having a stroke, the stroke being adjustable by a rotational adjustment of a relative rotational positioning between the further eccentric bushing and the further eccentric section, wherein the eccentric bushing and the further eccentric bushing are connected in a torque-proof manner by an elongated tube surrounding the tamper shaft between the eccentric bushing and the further eccentric bushing, the elongated tube mounted at each bushing with lateral play to compensate a lateral movement of the bushings due to the eccentricity of the respective eccentric sections on the tamper shaft, when the stroke being adjusted by a rotational adjustment of a relative rotational positioning between the eccentric bushings and the eccentric sections.

14. The tamper device of claim 1, comprising an electric motor, and wherein the drive force receiving element is configured to be driven by the electric motor.

15. The tamper device of claim 1, wherein the inner-toothed hollow wheel gear train comprises a strain wave gear.

16. The tamper device of claim 15, wherein the strain wave gear comprises a circular spline being connected to the tamper shaft in a torque-proof manner, a flex spline connected to the eccentric bushing in a torque-proof manner, and a drive element for moving the flex spline and connected to the drive force receiving element in a torque-proof manner.

17. The tamper device of claim 16, wherein the drive force receiving element comprises a brake force receiving element being configured to receive a brake force for driving the strain wave gear when the tamper shaft is rotating, the brake force receiving element configured to receive a brake force by comprising an adjustment wheel sitting on the tamper shaft, the adjustment wheel rotatable relative to the tamper shaft and being connected to the flex spline in a torque-proof manner via a connecting tube surrounding the tamper shaft, whereby the adjustment wheel is configured to drive the eccentric bushing in a direction against a direction of rotation of the tamper shaft when the adjustment wheel is receiving a brake force when the tamper shaft is rotating.

18. A screed of a working machine comprising a paver, comprising a tamper device according to claim 1.

19. A working machine comprising a road paver, comprising a screed according to claim 18.

20. A method for adjusting a stroke of a tamper device according to claim 1, for a screed of a working machine comprising a paver, the tamper device comprising: a rotatable driveable tamper shaft comprising an eccentric section, an eccentric bushing mounted on the eccentric section, a connecting rod being rotatable mounted on the eccentric bushing for being driveable with stroke motions having a stroke, the stroke being adjustable by an rotational adjustment of a relative rotational positioning between the eccentric bushing and the eccentric section, the method comprising:

providing the rotational adjustment by driving an inner-toothed hollow wheel gear train by providing a drive force to a drive force receiving element connected to the inner-toothed hollow wheel gear train and being configured to be able to receive the drive force for driving the inner-toothed hollow wheel gear train when the tamper shaft is rotating, the inner-toothed hollow wheel gear train also being connected to the tamper shaft and to the eccentric bushing.

21. A method according to claim 20, further comprising measuring an angle of the relative rotational positioning between the eccentric bushing and the eccentric section.

22. A method according to claim 21, further comprising using the measured angle of the relative rotational positioning to define the amount of rotational adjustment of the relative rotational positioning between the eccentric bushing and the eccentric section.

23. A computer program comprising program code means for performing the steps of claim 20 when said program is run on a computer.

24. A computer readable medium carrying a computer program comprising program code means for performing the steps of claim 20 when said program product is run on a computer.

25. A control unit for controlling a tamper device for a screed of a working machine comprising a paver, the control unit being configured to perform the steps of the method according to claim 20.

26. The control unit of claim 25, further comprising a mechanical and/or electrical sensor for measuring an angle of the relative rotational positioning between the eccentric bushing and the eccentric section.

27. A working machine comprising a road paver, comprising a control unit according to claim 25.

* * * * *